(12) United States Patent
Kakiuchi

(10) Patent No.: US 6,850,517 B1
(45) Date of Patent: Feb. 1, 2005

(54) SYSTEM AND METHOD FOR HIGH-CAPACITY ELECTRONIC SWITCHING

(75) Inventor: Motofumi Kakiuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/325,427

(22) Filed: Jun. 4, 1999

(30) Foreign Application Priority Data

Jun. 5, 1998 (JP) .......................................... 10-158193

(51) Int. Cl.$^7$ .......................... H04J 3/14; H04L 12/26; G06F 11/00; G08C 15/00; H04M 7/00
(52) U.S. Cl. ...................... 370/370; 370/218; 370/384; 370/522; 379/219; 379/230; 379/279
(58) Field of Search ................................ 370/217, 241, 370/242, 248, 250, 373, 370, 375, 384, 522, 354, 372, 409, 410; 379/269, 273, 279, 221

(56) References Cited

U.S. PATENT DOCUMENTS

| | | | | |
|---|---|---|---|---|
| 4,022,982 A | * | 5/1977 | Hemdal ........................ 370/388 |
| 4,370,742 A | * | 1/1983 | Minamitani et al. ......... 370/381 |
| 4,566,094 A | * | 1/1986 | Ardon et al. ................ 370/376 |
| 4,583,218 A | * | 4/1986 | Ardon et al. ................ 370/376 |
| 4,805,166 A | * | 2/1989 | Ardon et al. ................ 370/360 |
| 4,853,957 A | * | 8/1989 | Seeger et al. ............... 379/279 |
| 4,943,999 A | * | 7/1990 | Ardon .......................... 379/221 |
| 4,972,465 A | | 11/1990 | Cline et al. |
| 4,979,164 A | | 12/1990 | Ardon |
| 5,014,264 A | * | 5/1991 | Nagler et al. ............... 370/220 |
| 5,091,904 A | * | 2/1992 | Back et al. .................. 370/220 |
| 5,093,827 A | * | 3/1992 | Franklin et al. ............. 370/354 |
| 5,105,420 A | * | 4/1992 | Ardon et al. ................ 370/216 |
| 5,115,425 A | * | 5/1992 | Ardon .......................... 370/217 |
| 5,119,366 A | * | 6/1992 | Ardon et al. ................ 370/378 |
| 5,333,187 A | * | 7/1994 | Hiraiwa et al. ............. 379/219 |
| 5,513,177 A | * | 4/1996 | Sakurai et al. .............. 370/355 |
| 5,544,152 A | * | 8/1996 | Obermanns et al. ........ 370/409 |
| 5,848,053 A | * | 12/1998 | Ardon .......................... 370/218 |
| 5,914,952 A | * | 6/1999 | Eom et al. ................... 370/369 |
| 6,470,011 B1 | * | 10/2002 | Tanimura et al. ........... 370/369 |

FOREIGN PATENT DOCUMENTS

| | | |
|---|---|---|
| JP | H9-019598 | 1/1991 |
| JP | H9-312893 | 12/1997 |
| RU | 2101872 | 1/1998 |

\* cited by examiner

*Primary Examiner*—Man U. Phan
(74) *Attorney, Agent, or Firm*—Foley & Lardner LLP

(57) ABSTRACT

A high-capacity electronic switching system includes two or more first stage switch modules to each of which one or more subscriber terminals (telephone sets, fax machines, personal computers, etc.) are connected and each of which executes signal switching for signals from/to the subscriber terminals, and a second stage switch module for switching signals between the first stage switch modules. In the high-capacity electronic switching system, each of the first stage switch modules is connected to another one of the first stage switch modules via a special-purpose link for setting a communication link between the first stage switch modules when necessary. For example, the setting of the communication link via the special-purpose link is executed when an abnormal condition of the second stage switch module occurred and normal communication link setting between two first stage switch modules via the second stage switch module is impossible. By this, even when failure occurred to the second stage switch module and communication between two first stage switch modules is impossible, a communication link can be set between the first stage switch modules via the special-purpose link, and thereby communication between the first stage switch modules is realized.

28 Claims, 14 Drawing Sheets

F I G. 4
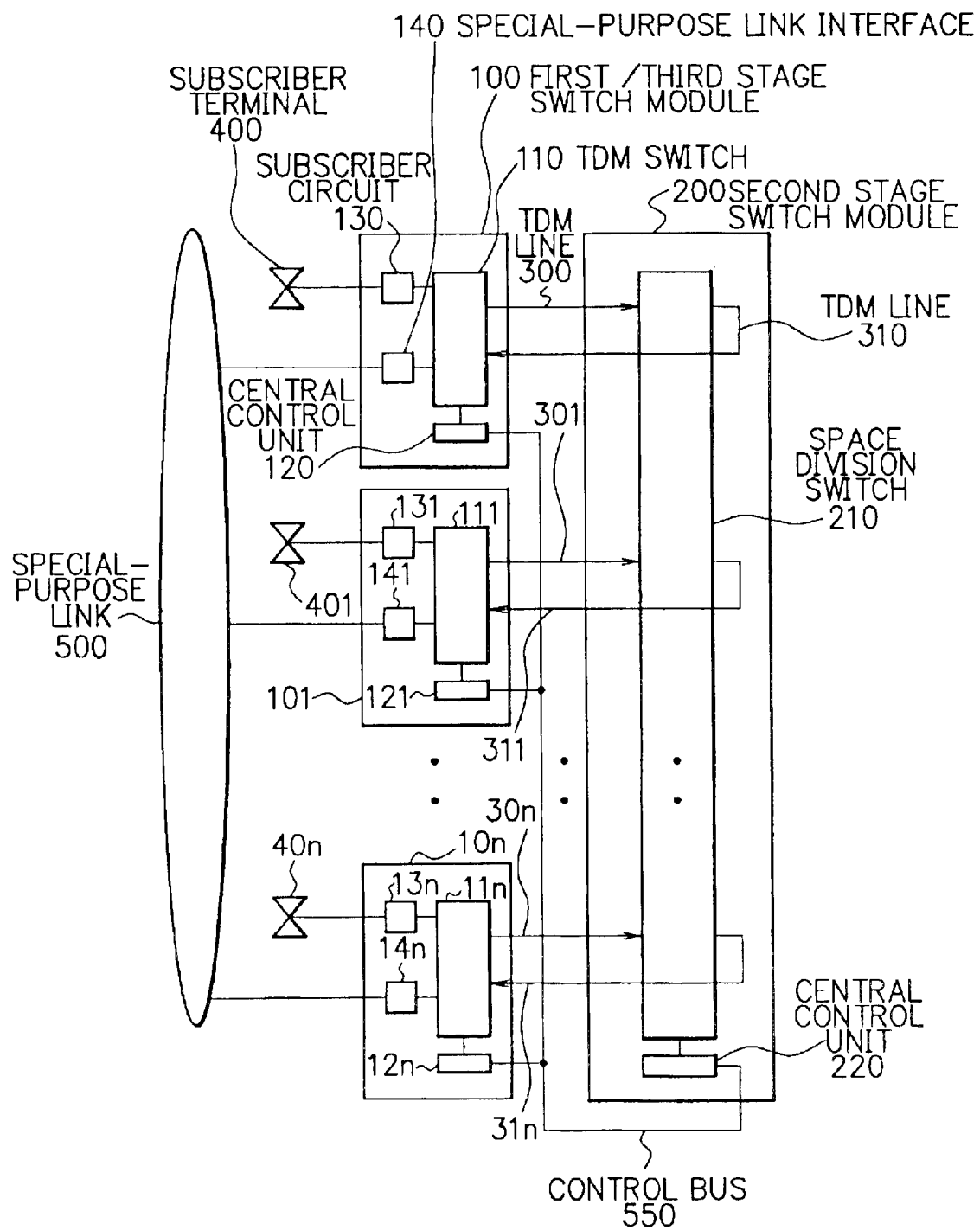

ABNORMAL CONDITION IN SPACE DIVISION SWITCH

ABNORMAL CONDITION IN CENTRAL CONTROL UNIT

ABNORMAL CONDITION IN CONTROL BUS 550

ABNORMAL CONDITION IN TDM LINES 300, 301, ··, 31n

F I G. 14
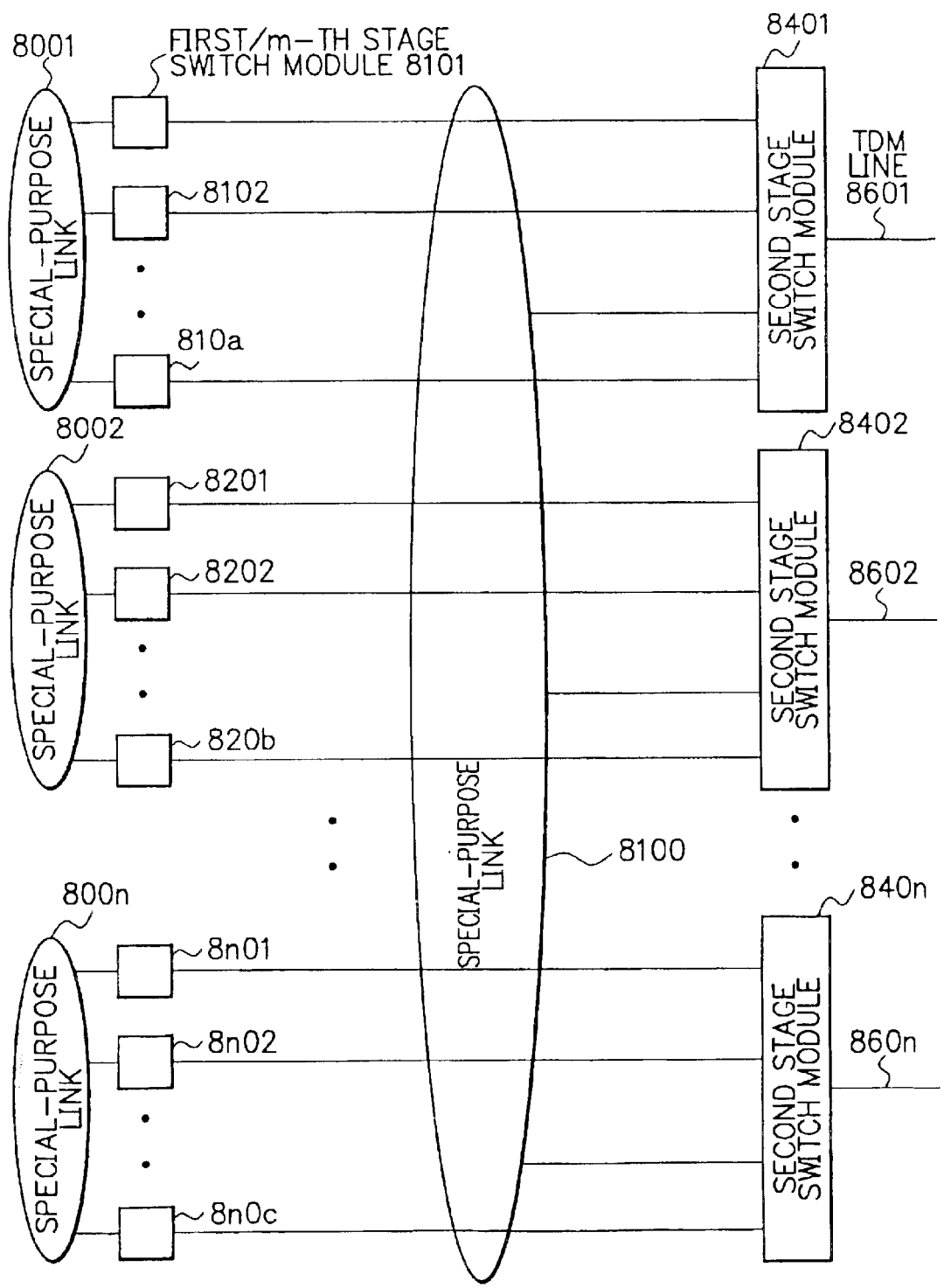

SYSTEM AND METHOD FOR HIGH-CAPACITY ELECTRONIC SWITCHING

BACKGROUND OF THE INVENTION

The present invention relates to a high-capacity electronic switching system and a high-capacity electronic switching method, and in particular, to a high-capacity electronic switching system and a high-capacity electronic switching method by which resistance to abnormal conditions is improved and thereby communication links can be set between subscriber terminals even in such abnormal conditions.

DESCRIPTION OF THE PRIOR ART

Electronic switching systems are widely used today in large-scale networks such as telephone networks, in order to switch and exchange information transmitted from terminals such as telephone sets, facsimile machines, servers, etc. For example, EPBXs (Electronic Private Branch Exchanges) are employed in buildings etc. as the electronic switching systems.

The electronic switching system is generally provided with subscriber circuits as the interface between the network and subscriber terminals (such as telephone sets, facsimile machines, servers, etc.), and trunk circuits as the interface between the network and other stations, networks, etc. A switch (communication link switch) is employed in the electronic switching system for switching and exchanging signals which are communicated between the subscriber circuits and the trunk circuits.

As the switch in the electronic switching system, TDM (Time Division Multiplexing) switches are widely employed. Such an electronic switching system employing a TDM switch is required high speed operation and large circuit scale if the number of the subscriber circuits becomes large. However, it is difficult to realize establishment of necessary communication links appropriately by means of one TDM switch, when the number of the subscriber circuits increases.

Therefore, in an electronic switching system having a large number of subscriber circuits, many stages of switches (such as TDM switches) are connected together in the form of a large-scale communication link switch so as to realize a high-capacity electronic switching system.

Such a high-capacity electronic switching system is typically realized by a 3-stage large-scale communication link switch in which three stages of switches (a first stage switch, a second stage switch and a third stage switch) are connected together.

In the following, examples of such conventional high-capacity electronic switching systems will be explained referring to FIG. 1 through FIG. 3. FIG. 1 is a schematic block diagram showing a first example of a conventional high-capacity electronic switching system which is realized by 3 stages of switches. Such a high-capacity electronic switching system is realized as, for example, an EPBX (Electronic Private Branch Exchange) in a building etc.

The first conventional high-capacity electronic switching system shown in FIG. 1 is composed of a first stage switch module 903 which is connected to a subscriber terminal 901 for switching (exchanging) and outputting a signal outputted by a subscriber terminal 901, a second stage switch module 905 for switching the signal outputted by the first stage switch module 903, a third stage switch module 907 for switching thee signal outputted by the second stage switch module 905 and outputting the signal to another subscriber terminal 909, and a central control unit 911 for controlling the operations of the first stage switch module 903, the second stage switch module 905 and the third stage switch module 907.

The operation of the first conventional high-capacity electronic switching system shown in FIG. 1 is controlled by the only one central control unit 911. For instance, when a call request from the subscriber terminal 901 occurred, the central control unit 911 sets a link of communication lines (hereafter, referred to as a "communication link") by controlling each of the switch modules 903, 905 and 907, and thereby realizes the communication between the subscriber terminals 901 and 909.

However, in the first conventional high-capacity electronic switching system, control of the switch modules becomes impossible when failure occurred in the central control unit 911, and thereby the setting of the communication link between subscriber terminals becomes impossible. Therefore, the first conventional high-capacity electronic switching system lacks resistance to abnormality such as failure in the central control unit 911.

FIG. 2 shows the case where failure occurred in the central control unit 911. Referring to FIG. 2, in the case where an abnormal condition occurred in the central control unit 911 and the central control unit 911 is disabled from operating normally, the control of the first stage switch module 903, the second stage switch module 905 and the third stage switch module 907 becomes impossible even if the switch modules 903, 905 and 907 are in normal operating conditions, and thus the setting of the communication link between the subscriber terminals 901 and 909 can not be executed.

In order to resolve the above problem, a high-capacity electronic switching system shown in FIG. 3 has been proposed. FIG. 3 is a schematic block diagram showing a second example of a conventional high-capacity electronic switching system which is realized by 3 stages of switches.

The second conventional high-capacity electronic switching system shown in FIG. 3 is mainly composed of a second stage switch module 700 and n+1 (n: integer larger than 0) first/third stage switch modules 600, 601, . . . , 60n. Subscriber circuits 630, 631, . . . , 63n are included in the first/third stage switch modules 600, 601, . . . , 60n respectively, and the first/third stage switch modules 600, 601, . . . , 60n are connected together by the second stage switch module 700.

Each of the first/third stage switch modules 600, 601, . . . , 60n is connected with the second stage switch module 700 via a TDM (Time Division Multiplexing) line (800, 801, . . . , 80n) and a TDM line (810, 811, . . . , 81n), respectively.

Each of the first/third stage switch modules 600, 601, . . . , 60n is composed of a first/third stage switch (610, 611, . . . , 61n), a central control unit (620, 621, . . . , 62n) for controlling the first/third stage switch (610, 611, . . . , 61n), and a subscriber circuit (630, 631, . . . , 63n) for connecting a subscriber terminal (900, 901, . . . , 90n) with the first/third stage switch (610, 611, . . . , 61n). Incidentally, while each first/third stage switch module (600, 601, . . . , 60n) includes only one subscriber circuit (630, 631, . . . , 63n), and only one subscriber terminal (900, 901, . . . , 90n) is connected to the subscriber circuit in FIG. 3, the number of subscriber circuits in a first/third stage switch module can be two or more, and the number of subscriber terminals connected to a subscriber circuit can also be two or more. Each of the first/third stage switches 610, 611, . . . , 61n is realized by a TDM (Time Division Multiplexing) switch.

The first/third stage switches 610, 611, . . . , 61n are controlled by the central control units 620, 621, . . . , 62n, respectively. According to the control by the central control unit (620, 621, . . . , 62n), the first/third stage switch (610, 611, . . . , 61n) sends signals supplied from the subscriber circuit (630, 631, . . . , 63n) to the TDM line (800, 801, . . . , 80n) respectively by executing necessary time slot exchange (i.e. data transfer between time slots), and sends signals supplied from the TDM line (810, 811, . . . , 81n) to the subscriber circuit (630, 631, . . . , 63n) respectively by executing necessary time slot exchange. The central control unit (620, 621, . . . , 62n) also controls the subscriber circuit (630, 631, . . . , 63n).

The second stage switch module 700 is composed of a second stage switch 710 and a central control unit 720 for controlling the second stage switch 710. The second stage switch 710 is realized by a space division switch. According to the control by the central control unit 720, the second stage switch 710 sends signals supplied from one of the first/third stage switch modules 600, 601, . . . , 60n via the inlet TDM line (800, 801, . . . , 80n) to one of the outlet TDM lines 810, 811, . . . , 81n, by transferring signals in a channel (time slot) on the inlet TDM line (800, 801, . . . , 80n) to the same channel (time slot) on the outlet TDM line (810, 811, . . . , 81n).

The central control unit (620, 621, . . . , 62n) of the first/third stage switch module (600, 601, . . . , 60n) and the central control unit 720 of the second stage switch module 700 execute control of each switch module (600, 601, . . . , 60n, 700) respectively, however, the central control units 620, 621, . . . , 62n and 720 are connected together by a control bus 950. Therefore, the central control units 620, 621, . . . , 62n and 720 can communicate and exchange control information that is necessary for their switching operations.

In the following, the operation of the second conventional high-capacity electronic switching system of FIG. 3 will be explained briefly. Incidentally, in the following explanation, the subscriber terminal 900 which is connected to the subscriber circuit 630 of the first/third stage switch module 600 will be described as a calling subscriber terminal, and the subscriber terminal 901 which is connected to the subscriber circuit 631 of the first/third stage switch module 601 will be described as a receiving subscriber terminal.

In order to establish connection between the calling subscriber terminal 900 and the receiving subscriber terminal 901, communication links have to be set in the first stage switch (i.e. the first/third stage switch 610) of the first/third stage switch module 600, in the second stage switch 710 of the second stage switch module 700, and in the third stage switch (i.e. the first/third stage switch 611) of the first/third stage switch module 601.

In order to set the communication links, the subscriber circuit 630 to which the calling subscriber terminal 900 is connected and the TDM line 800 are connected together in the first/third stage switch module 600. For this, the central control unit 620 of the first/third stage switch module 600 requests the central control unit 720 of the second stage switch module 700 to select a channel (time slot) that is usable in common on the TDM lines 800, 811, 801 and 810 which connect the first/third stage switch 610 and the first/third stage switch 611 via the second stage switch 710, and the central control unit 720 selects the channel (time slot). According to the control by the central control unit 620, the first/third stage switch 610 transfers signals in a time slot which has been assigned to the subscriber circuit 630 to the above selected time slot on the TDM line 800.

In the second stage switch module 700, the central control unit 720 controls the second stage switch 710 and thereby connects the TDM line 800 to the TDM line 811. For this, the central control unit 720 controls the second stage switch 710 to transfer signals in the selected channel (time slot) on the TDM line 800 to the same channel (time slot) on the TDM line 811.

Subsequently, in the first/third stage switch module 601, the central control unit 621 controls the first/third stage switch 611 and thereby connects the TDM line 811 to the subscriber circuit 631 to which the subscriber terminal 901 is connected. For this, the central control unit 621 controls the first/third stage switch 611 to transfer signals in the time slot on the TDM line 811 to a time slot which has been assigned to the subscriber circuit 631.

As explained above, the central control units 620, 621 and 700 communicate control information which is necessary for setting the communication links between the first/third stage switch modules 600 and 601, via the control bus 950. Time slot exchanges for signal transmission from the subscriber terminal 901 to the subscriber terminal 900 is executed similarly. By the operations described above, a communication link is established between the subscriber terminals 900 and 901.

Therefore, in the second conventional high-capacity electronic switching system of FIG. 3, a high-capacity electronic switching system can be realized without enlarging the scale of each switch, by employing many-stage connection (3-stage connection) of switches, similarly to the first conventional high-capacity electronic switching system of FIG. 1. Further, as explained above, each first/third stage switch module (600, 601, . . . , 60n) is provided with the central control unit (620, 621, . . . , 62n) for controlling its operation. In other words, the second conventional high-capacity electronic switching system of FIG. 3 is provided with the central control units 620, 621, . . . , 62n and 720 dispersively or in a decentralized manner. Therefore, the second conventional high-capacity electronic switching system is not wholly disabled even if failure occurred in a central control unit in a first/third stage switch module. For example, even when failure occurred in the central control unit 620 of the first/third stage switch module 600, data communication between the first/third stage switch modules 601 and 602 can be executed normally since the central control units 620, 621, . . . , 62n and 720 are provided dispersively.

However, even in the second conventional high-capacity electronic switching system, a communication link between two subscriber terminals has to be set via the second stage switch module 700 if the two subscriber terminals are connected to different first/third stage switch modules. Therefore, if an abnormal condition occurred in the second stage switch module 700 and the second stage switch module 700 can not execute signal switching normally, the communication link setting between the two subscriber terminals becomes impossible.

In the case where the second stage switch module 700 can not execute signal switching normally, signal communication between two subscriber terminals is possible only when the two subscriber terminals are connected to the same first/third stage switch module. In such cases, signal switching is executed only in the first/third stage switch module. However, if the two subscriber terminals are connected to different first/third stage switch modules, signal switching and data communication between the two subscriber terminals become impossible.

SUMMARY OF THE INVENTION

It is therefore the primary object of the present invention to provide a high-capacity electronic switching system, in which communication link setting between the subscriber terminals can be executed even when the communication link setting via an upper stage switch module (the second stage switch module etc.) is impossible.

Another object of the present invention is to provide a high-capacity electronic switching method, by which communication link setting between the subscriber terminals can be executed even when the communication link setting via an upper stage switch module (the second stage switch module etc.) is impossible.

In accordance with a first aspect of the present invention, there is provided a high-capacity electronic switching system comprising two or more first stage switch modules to each of which one or more subscriber terminals are connected and each of which executes signal switching for signals from/to the subscriber terminals, and a second stage switch module for receiving a signal outputted by one of the first stage switch modules via a line, switching the signal, and thereby outputting the signal to another one of the first stage switch modules via a line. In the high-capacity electronic switching system, each of the first stage switch modules is connected to another one of the first stage switch modules via a special-purpose link for setting a communication link between the first stage switch modules when necessary.

In accordance with a second aspect of the present invention, in the first aspect, every two of the first stage switch modules are connected together by a line of the special-purpose link directly.

In accordance with a third aspect of the present invention, in the first aspect, the special-purpose link connects the first stage switch modules so that communication links between every two first stage switch modules can at least be set via one or more lines of the special-purpose link.

In accordance with a fourth aspect of the present invention, in the first aspect, the setting of the communication link via the special-purpose link is executed when an abnormal condition of the second stage switch module occurred and normal communication link setting between two first stage switch modules via the second stage switch module is impossible.

In accordance with a fifth aspect of the present invention, in the first aspect, the high-capacity electronic switching system includes one or more central control units for controlling the first stage switch modules and the second stage switch module.

In accordance with a sixth aspect of the present invention, in the fifth aspect, the central control units include one or more first central control units for controlling the first stage switch modules and a second central control unit for controlling the second stage switch module, and necessary control information is communicated between the central control units via a control bus.

In accordance with a seventh aspect of the present invention, in the sixth aspect, the setting of the communication link via the special-purpose link is executed when an abnormal condition of the control bus such as disconnection occurred and the control information communication between the central control units via the control bus is impossible.

In accordance with an eighth aspect of the present invention, in the first aspect, the setting of the communication link via the special-purpose link is executed when an abnormal condition of the line between the first stage switch module and the second stage switch module such as disconnection occurred and normal communication link setting between two first stage switch modules via the line is impossible.

In accordance with a ninth aspect of the present invention, in the first aspect, the special-purpose link communicates analog signals.

In accordance with a tenth aspect of the present invention, in the first aspect, the special-purpose link communicates digital signals.

In accordance with an eleventh aspect of the present invention, in the first aspect, the special-purpose link employs channel associated signaling.

In accordance with a twelfth aspect of the present invention, in the first aspect, the special-purpose link employs common channel signaling.

In accordance with a thirteenth aspect of the present invention, there is provided a high-capacity electronic switching system comprising two or more first stage switch modules to each of which one or more subscriber terminals are connected and each of which executes signal switching for signals from/to the subscriber terminals, and two or more second stage switch modules each of which executes signal switching between the first stage switch modules and signal switching between the first stage switch module and a third stage switch module. In the high-capacity electronic switching system, each of the first stage switch modules is connected to another one of the first stage switch modules via a special-purpose link for setting a communication link between the first stage switch modules when necessary, and each of the second stage switch modules is connected to another one of the switch modules via a special-purpose link for setting a communication link between the switch modules when necessary.

In accordance with a fourteenth aspect of the present invention, in the thirteenth aspect, every two of the second stage switch modules are connected together by a line of the special-purpose link directly.

In accordance with a fifteenth aspect of the present invention, in the thirteenth aspect, the special-purpose link connects the second stage switch modules so that communication links between every two second nil stage switch modules can at least be set via one or more lines of the special-purpose link.

In accordance with a sixteenth aspect of the present invention, in the thirteenth aspect, the setting of the communication link via the special-purpose link is executed when an abnormal condition of an upper stage switch module occurred and normal communication link setting between two switch modules via the upper stage switch module is impossible.

In accordance with a seventeenth aspect of the present invention, in the thirteenth aspect, the high-capacity electronic switching system includes one or more central control units for controlling the switch modules, and necessary control information is communicated between the central control units via a control bus.

In accordance with an eighteenth aspect of the present invention, in the seventeenth aspect, the setting of the communication link via the special-purpose link is executed when an abnormal condition of the control bus such as disconnection occurred and the control information communication between the central control units via the control bus is impossible.

In accordance with a nineteenth aspect of the present invention, in the thirteenth aspect, the setting of the communication link via the special-purpose link is executed when an abnormal condition of a line between switch modules such as disconnection occurred and normal communication link setting between two switch modules via the line is impossible.

In accordance with a twentieth aspect of the present invention, in the thirteenth aspect, the special-purpose link communicates analog signals.

In accordance with a twenty-first aspect of the present invention, in the thirteenth aspect, the special-purpose link communicates digital signals.

In accordance with a twenty-second aspect of the present invention, in the thirteenth aspect, the special-purpose link employs channel associated signaling.

In accordance with a twenty-third aspect of the present invention, in the thirteenth aspect, the special-purpose link employs common channel signaling.

In accordance with a twenty-fourth aspect of the present invention, there is provided a high-capacity electronic switching method for a high-capacity electronic switching system including two or more first stage switch modules to each of which one or more subscriber terminals are connected and each of which executes signal switching for signals from/to the subscriber terminals, and a second stage switch module for receiving a signal outputted by one of the first stage switch modules via a line, switching the signal, and thereby outputting the signal to another one of the first stage switch modules via a line. According to the high-capacity electronic switching method, each of the first stage switch modules is connected to another one of the first stage switch modules via a special-purpose link, and a communication link is set between the first stage switch modules via the special-purpose link when necessary.

In accordance with a twenty-fifth aspect of the present invention, in the twenty-fourth aspect, every two of the first stage switch modules are connected together by a line of the special-purpose link directly.

In accordance with a twenty-sixth aspect of the present invention, in the twenty-fourth aspect, the special-purpose link is connected so that communication links between every two first stage switch modules can at least be set via one or more lines of the special-purpose link.

In accordance with a twenty-seventh aspect of the present invention, in the twenty-fourth aspect, the setting of the communication link via the special-purpose link is executed when an abnormal condition of the second stage switch module occurred and normal communication link setting between two first stage switch modules via the second stage switch module is impossible.

In accordance with a twenty-eighth aspect of the present invention, in the twenty-fourth aspect, the setting of the communication link via the special-purpose link is executed when an abnormal condition of a control bus for communicating necessary control information between central control units of the switch modules occurred and the control information communication between the central control units via the control bus is impossible.

In accordance with a twenty-ninth aspect of the present invention, in the twenty-fourth aspect, the setting of the communication link via the special-purpose link is executed when an abnormal condition of the line between the first stage switch module and the second stage switch module such as disconnection occurred and normal communication link setting between two first stage switch modules via the line is impossible.

In accordance with a thirtieth aspect of the present invention, there is provided a high-capacity electronic switching method for a high-capacity electronic switching system including two or more first stage switch modules to each of which one or more subscriber terminals are connected and each of which executes signal switching for signals from/to the subscriber terminals, and two or more second stage switch modules each of which executes signal switching between the first stage switch modules and signal switching between the first stage switch module and a third stage switch module. According to the high-capacity electronic switching method, each of the first stage switch modules is connected to another one of the first stage switch modules via a special-purpose link, and a communication link is set between the first stage switch modules via the special-purpose link when necessary, and each of the second stage switch modules is connected to another one of the switch modules via a special-purpose link, and a communication link is set between the switch modules via the special-purpose link when necessary.

In accordance with a thirty-first aspect of the present invention, in the thirtieth aspect, every two of the second stage switch modules are connected together by a line of the special-purpose link directly.

In accordance with a thirty-second aspect of the present invention, in the thirtieth aspect, the special-purpose link is connected so that communication links between every two second stage switch modules can at least be set via one or more lines of the special-purpose link.

In accordance with a thirty-third aspect of the present invention, in the thirtieth aspect, the setting of the communication link via the special-purpose link is executed when an abnormal condition of an upper stage switch module occurred and normal communication link setting between two switch modules via the upper stage switch module is impossible.

In accordance with a thirty-fourth aspect of the present invention, in the thirtieth aspect, the setting of the communication link via the special-purpose link is executed when an abnormal condition of a control bus for communicating necessary control information between central control units of the switch modules occurred and the control information communication between the central control units via the control bus is impossible.

In accordance with a thirty-fifth aspect of the present invention, in the thirtieth aspect, the setting of the communication link via the special-purpose link is executed when an abnormal condition of a line between switch modules such as disconnection occurred and normal communication link setting between two switch modules via the line is impossible.

BRIEF DESCRIPTION OF THE DRAWINGS

The objects and features of the present invention will become more apparent from the consideration of the following detailed description taken in conjunction with the accompanying drawings, in which:

FIG. 4 is a schematic block diagram showing a high-capacity electronic switching system according to a first embodiment of the present invention;

FIG. 14 is a schematic block diagram showing a high-capacity electronic switching system according to a second embodiment of the present invention.

DESCRIPTION OF THE PREFERRED EMBODIMENTS

Figure 1:
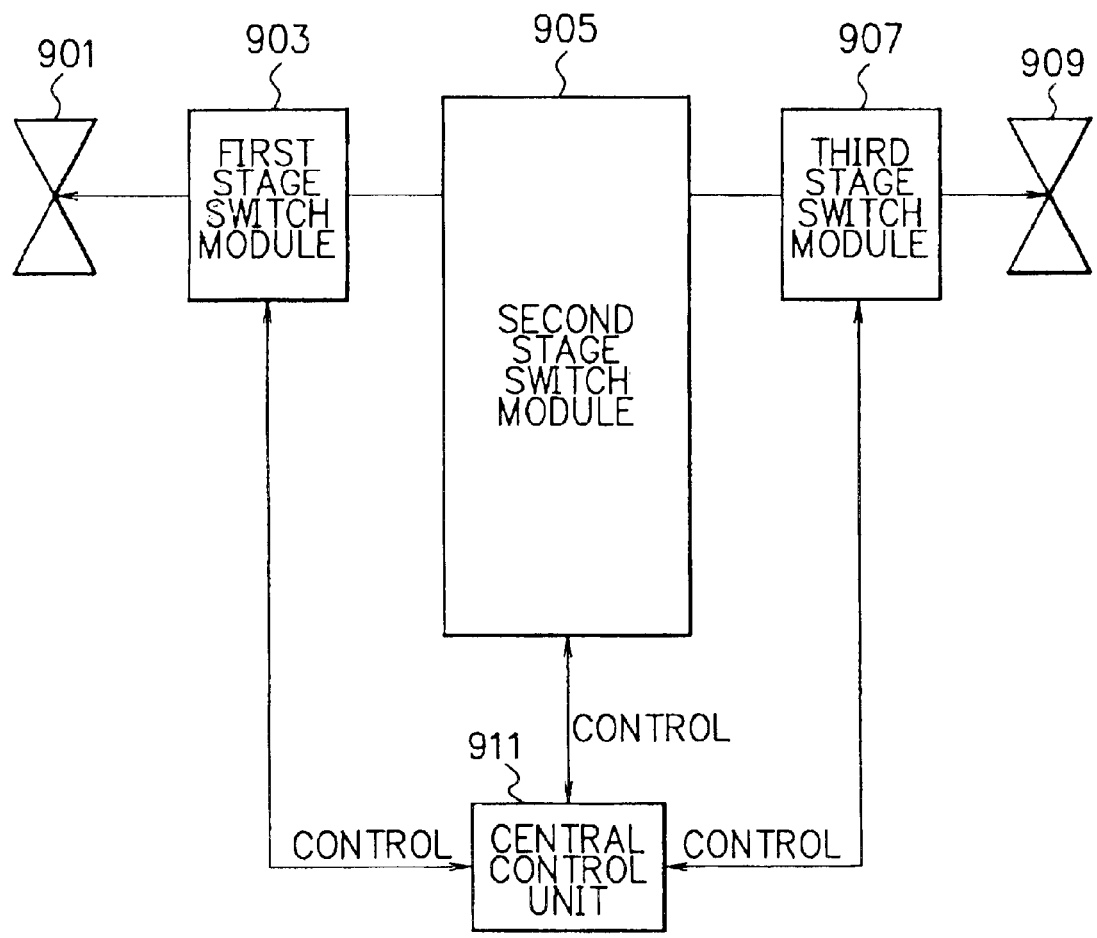
FIG. 1 is a schematic block diagram showing a first example of a conventional high-capacity electronic switching system which is realized by 3 stages of switches.
Figure 2:
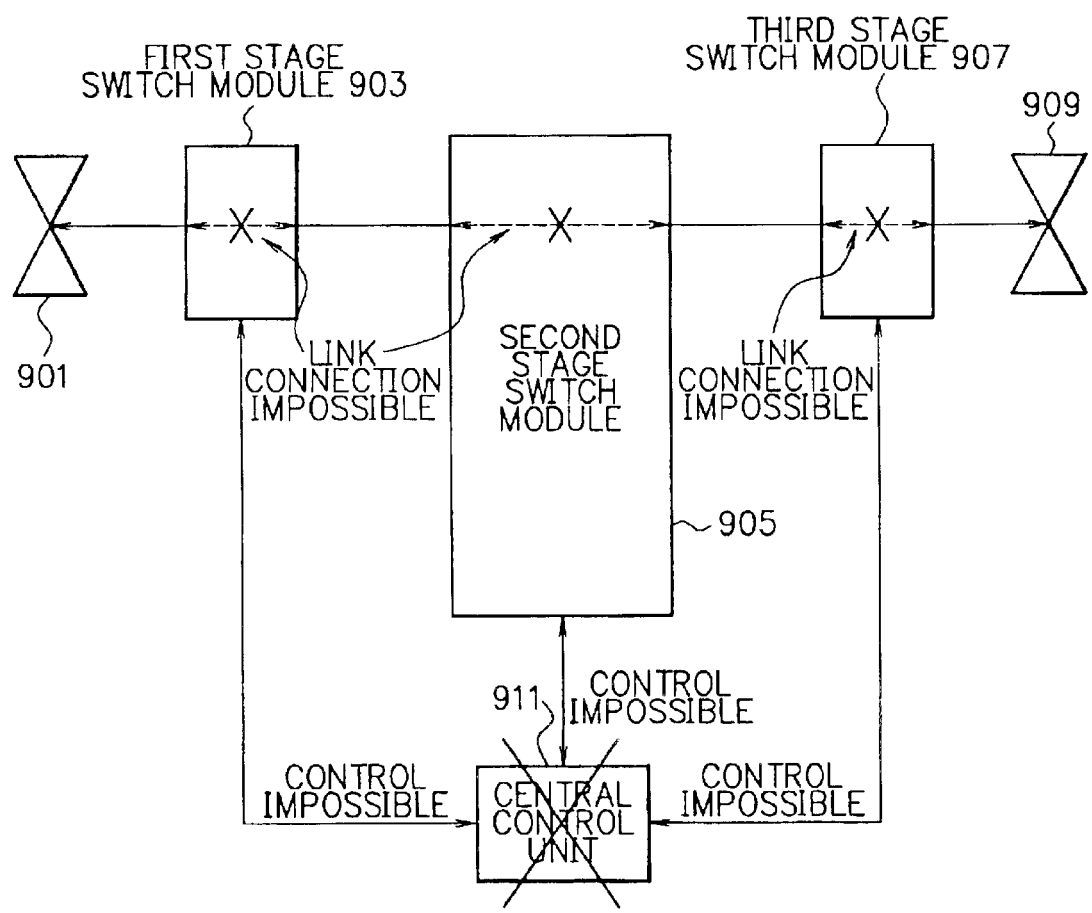
FIG. 2 is a schematic block diagram showing a case where failure occurred in the central control unit of the conventional high-capacity electronic switching system of FIG. 1.

Referring now to the drawings, a description will be given in detail of preferred embodiments in accordance with the present invention.

FIG. 4 is a schematic block diagram showing a high-capacity electronic switching system according to a first embodiment of the present invention. The high-capacity electronic switching system shown in FIG. 4 employs alternative communication links for the TDM communication links.

Referring to FIG. 4, the high-capacity electronic switching system of the first embodiment employs 3-stage connection of switches similarly to the prior art. The high-capacity electronic switching system is mainly composed of a second stage switch module 200, n+1 (n: integer larger than 0) first/third stage switch modules 100, 101, . . . , 10n, and a special-purpose link 500.

The first/third stage switch module 100 includes a subscriber circuit 130, a special-purpose link interface 140, a TDM (Time Division Multiplexing) switch 110 and a central control unit 120 for controlling the subscriber circuit 130, the special-purpose link interface 140 and the TDM switch 110. Similarly, each first/third stage switch module (101, 102, . . . , 10n) includes a subscriber circuit (131, 132, . . . , 13n), a special-purpose link interface (141, 142, . . . , 14n), a TDM switch (111, 112, . . . , 11n) and a central control unit (121, 122, . . . , 12n), respectively.

The second stage switch module 200 includes a space division switch 210 and a central control unit 220 for controlling the space division switch 210.

Figure 5A:
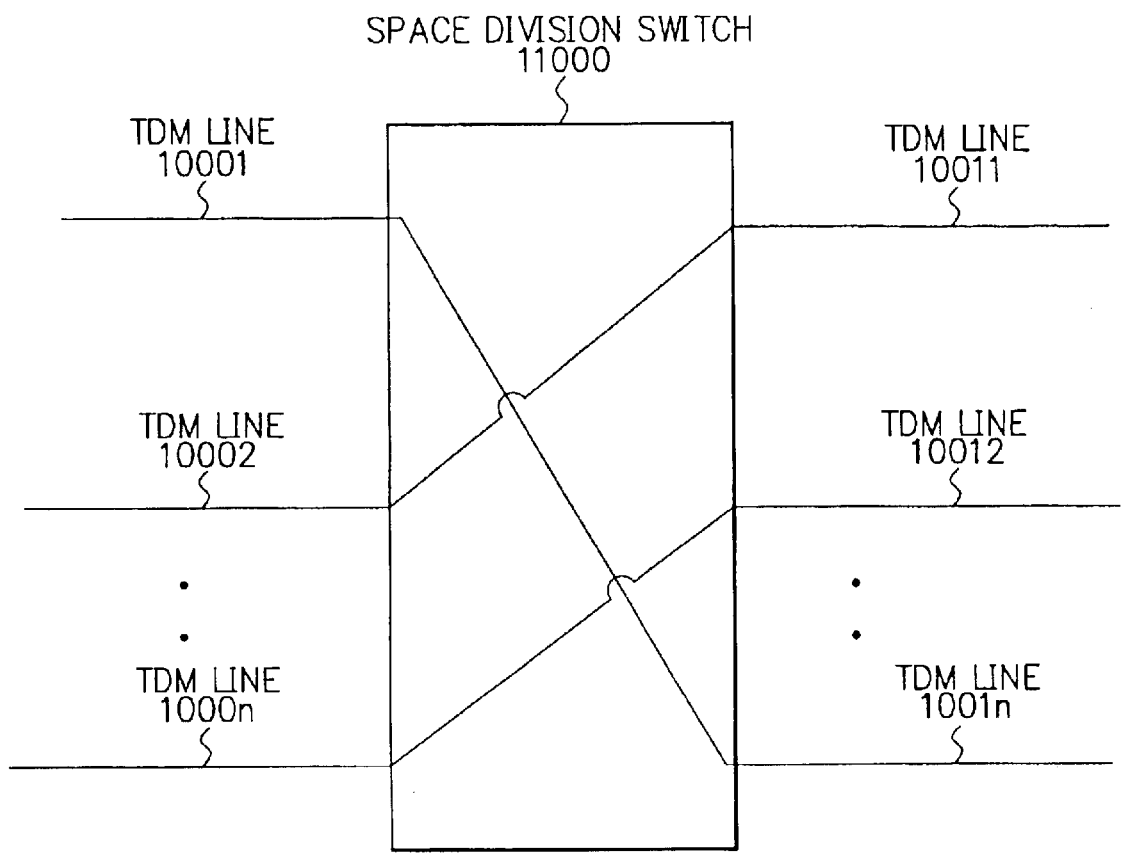
FIG. 5A is a schematic diagram showing an example of a space division switch.

In the following, an explanation on the TDM (Time Division Multiplexing) switch and the space division switch will be given referring to FIG. 5A and FIG. 5B. FIG. 5A is a schematic diagram showing an example of a space division switch, and FIG. 5B is a schematic diagram showing an example of a TDM switch.

The space division switch 11000 shown in FIG. 5A is a switch for physically and separately connecting TDM lines 10001, 10002, . . . , 1000n on the left-hand side of FIG. 5A with different TDM lines 10011, 10012, . . . , 1001n on the right-hand side of FIG. 5A. The space division switch 11000 realizes its switching operation by transferring a signal in a time slot on an inlet TDM line into the same time slot on an outlet TDM line. Incidentally, the "n" in the above notation means an arbitrary integer larger than 1, and thus the number of the TDM lines connected to the space division switch 11000 can be varied arbitrarily.

Figure 5B:
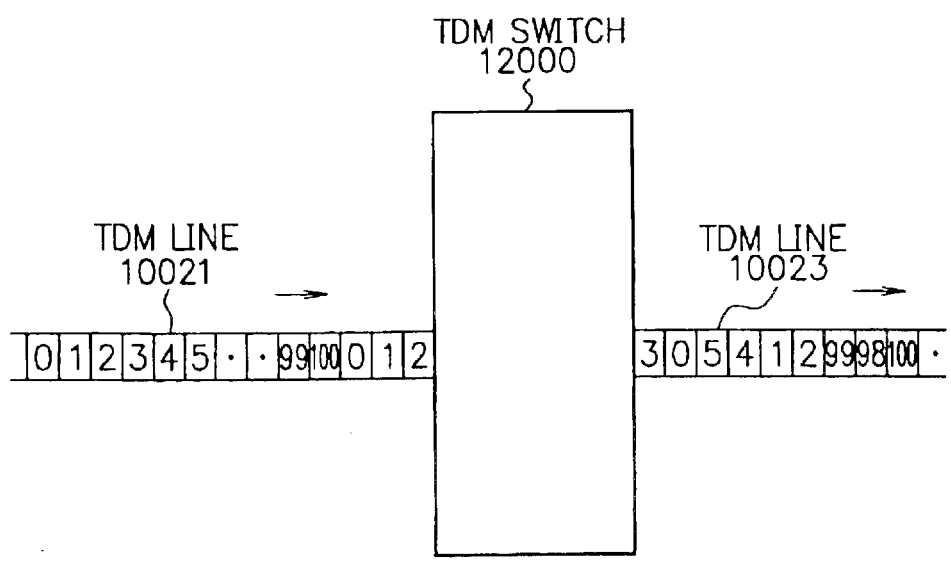
FIG. 5B is a schematic diagram showing an example of a TDM switch.

The TDM switch 12000 shown in FIG. 5B is a switch for changing the order of signals which have been transmitted by an inlet TDM line 10021 (i.e. interchanging time slots), and outputting the interchanged signals to an outlet TDM line 10023. Incidentally, while time slots 0 through 100 have been time division multiplexed in the example of FIG. 5B, the number of multiplexed time slots can be varied arbitrarily.

In the following, the central control unit (120, 121, . . . , 12n) provided in the first/third stage switch module (100, 101, . . . , 10n) and the central control unit 220 provided in the second stage switch module 200 which are shown in FIG. 4 will be explained.

The central control units 120, 121, . . . , 12n of the first/third stage switch modules 100, 101, . . . , 10n and the central control unit 220 of the second stage switch module 200 are connected together by a control bus 550, and control information necessary for connection of communication links between the switch modules is communicated via the control bus 550.

The TDM switch 110 of the first/third stage switch module 100 is connected with the space division switch 210 of the second stage switch module 200 via TDM lines 300 and 310. Similarly, each of the TDM switches 111, 112, . . . , 11n of the first/third stage switch modules 101, 102, . . . , 10n is connected with the space division switch 210 of the second stage switch module 200 via a TDM line (301, 302, . . . , 30n) and a TDM line (311, 312, . . . , 31n), respectively.

The TDM lines 300, 301, . . . , 30n are utilized for transmitting signals from the first/third stage switch modules 100, 101, . . . , 10n to the second stage switch module 200, and the TDM lines 310, 311, . . . , 31n are utilized for transmitting signals from the second stage switch module 200 to the first/third stage switch modules 100, 101, ..., 10n.

To the first/third stage switch modules 100, 101, ..., 10n, subscriber terminals 400, 401, ..., 40n are connected via subscriber circuits 130, 131, ..., 13n, respectively.

Incidentally, while each first/third stage switch module (100, 101, ..., 10n) includes only one subscriber circuit (130, 131, ..., 13n), and only one subscriber terminal (400, 401, ..., 40n) is connected to the subscriber circuit in FIG. 4, the number of subscriber circuits in a first/third stage switch module can be two or more, and the number of subscriber terminals connected to a subscriber circuit can also be two or more.

Figure 6:
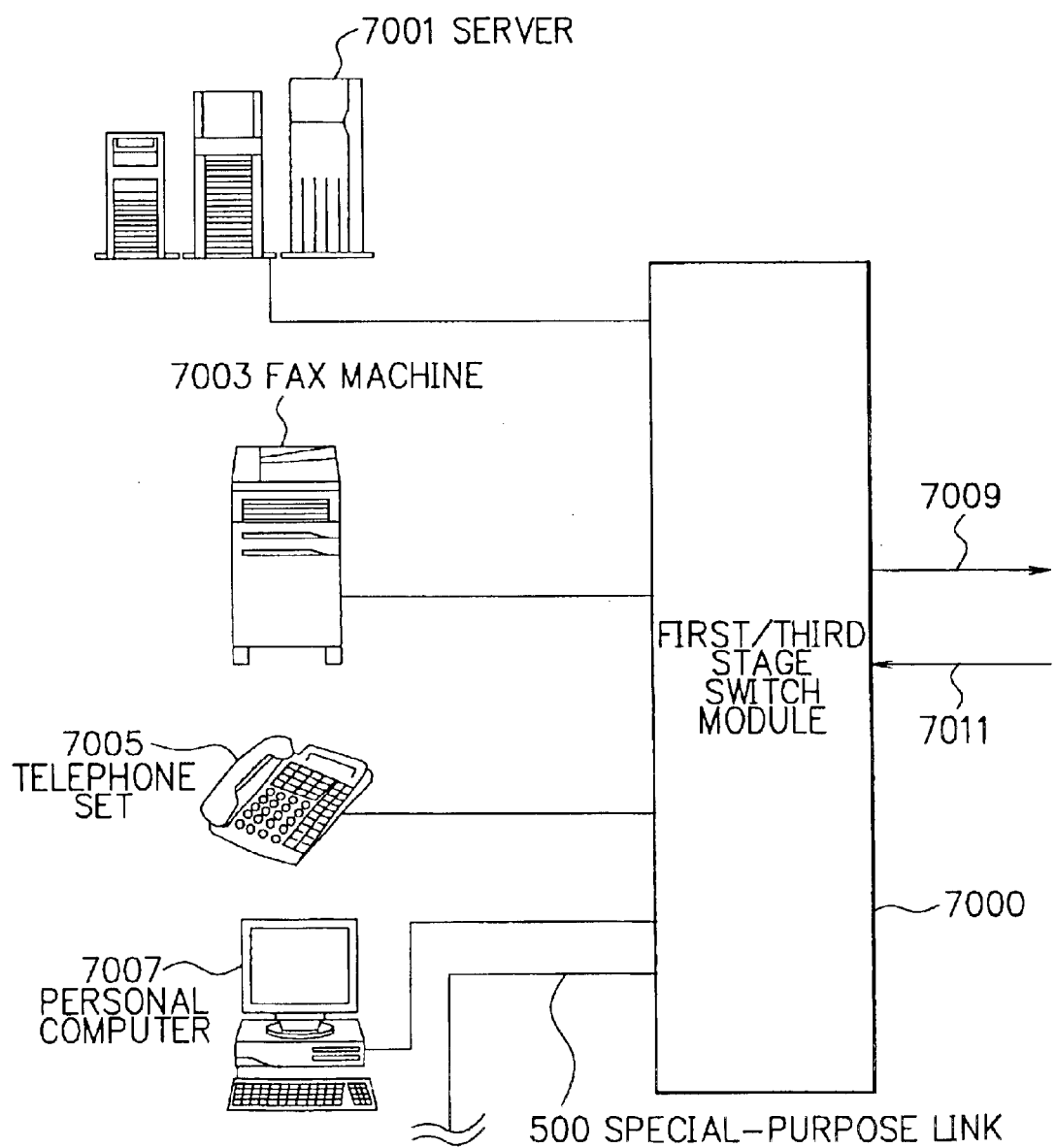
FIG. 6 is a schematic diagram showing examples of subscriber terminals which can be connected to first/third stage switch modules of the high-capacity electronic switching system of FIG. 4.

Various types of subscriber terminals can be connected to the first/third stage switch modules 100, 101, ..., 10n as the subscriber terminals 400, 401, ..., 40n shown in FIG. 4. FIG. 6 is a schematic diagram showing examples of subscriber terminals which can be connected to the first/third stage switch module (100, 101, ..., 10n) of the high-capacity electronic switching system according to the present invention. Referring to FIG. 6, the first/third stage switch module 7000 is connected with the special-purpose link 500 (via a special-purpose link interface) and TDM lines 7009 and 7011 (to/from the second stage switch module 200). To the first/third stage switch module 7000, a server 7001, a facsimile machine 7003, a telephone set 7005 and a personal computer 7007 are connected as the subscriber terminals 400, 401, ..., 40n. Incidentally, while subscriber terminals of different types are connected to the first/third stage switch module 7000 in FIG. 6, of course, two or more subscriber terminals of the same type can also be connected to the first/third stage switch module 7000. In addition, other types of subscriber terminals such as an ATM-LAN, an ISDN extension, an ATM multiplexing system (such as an ATM switch), a BS repeater, etc. can also be connected to the first/third stage switch module 7000.

In the following, the high-capacity electronic switching system of the first embodiment will be explained more in detail. The high-capacity electronic switching system of FIG. 4 is provided with the special-purpose link 500 for connecting the first/third stage switch modules 100, 101, ..., 10n. Therefore, each first/third stage switch module (100, 101, ..., 10n) is provided with the special-purpose link interface (140, 141, ..., 14n) for connecting the first/third stage switch module (100, 101, ..., 10n) to the special-purpose link 500.

Figure 7:
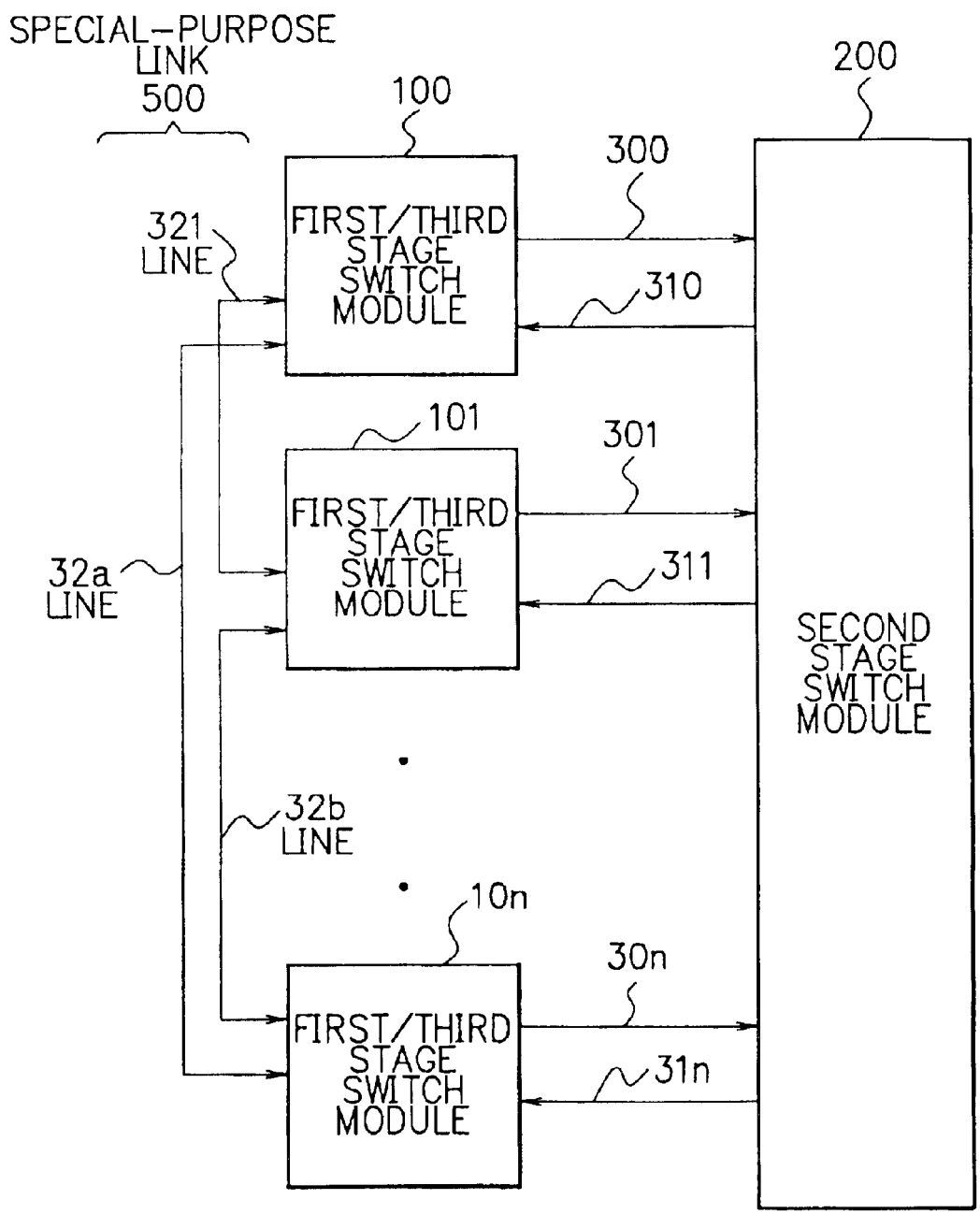
FIG. 7 is a schematic diagram showing an example of connection of a special-purpose link of the high-capacity electronic switching system of FIG. 4.
Figure 8:
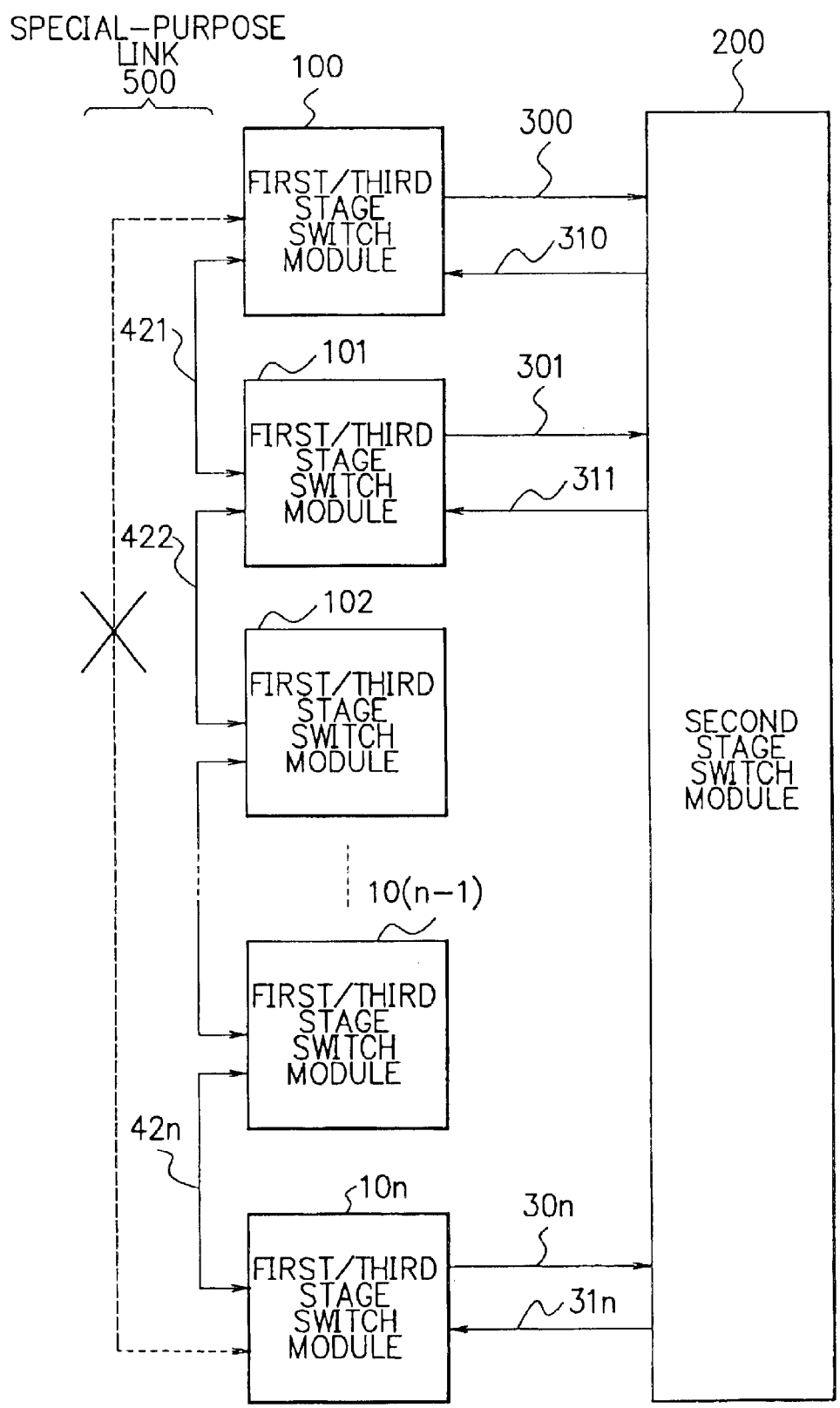
FIG. 8 is a schematic diagram showing another example of connection of the special-purpose link.

The special-purpose link 500 is realized by electrically connecting the first/third stage switch modules 100, 101, ..., 10n by wire or lines. FIGS. 7 and 8 are schematic diagrams showing examples of connection of the special-purpose link 500.

Referring to the first example of FIG. 7, the special-purpose link 500 connects the n+1 first/third stage switch modules 100, 101, ..., 10n by (n+1)n/2 lines including lines 321, 32a and 32b which are shown in FIG. 7. In FIG. 7, the line 321 is directly connecting the first/third stage switch modules 100 and 101, the line 32a is directly connecting the first/third stage switch modules 100 and 10n, and the line 32b is directly connecting the first/third stage switch modules 101 and 10n. Each line (321, 322, ...) directly connects two of the first/third stage switch modules 100, 101, ..., 10n, and every two first/third stage switch modules are connected by a line of the special-purpose link 500 directly.

By such connection of the special-purpose link 500, even when the second stage switch module 200 is in an abnormal condition and can not operate normally, the communication link between two first/third stage switch modules can be established via the special-purpose link 500 (not via the second stage switch module 200), by control operations which will be described later.

Referring to the second example of FIG. 8, the special-purpose link 500 connects the n+1 first/third stage switch modules 100, 101, ..., 10n by n lines including lines 421, 422 and 42n which are shown in FIG. 8. In FIG. 8, the line 421 is directly connecting the first/third stage switch modules 100 and 101, the line 422 is directly connecting the first/third stage switch modules 101 and 102, and the line 42n is directly connecting the first/third stage switch modules 10(n-1) and 10n. To sum up, each line (421, 422, ..., 42n) directly connects two adjacent first/third stage switch modules. Therefore, for example, the first/third stage switch modules 100 and 10n are not directly connected by a line. However, the first/third stage switch modules 100 and 10n are connected together by lines 421 through 42n and the first/third stage switch modules 101 through 10(n-1).

Even by such connection of the special-purpose link 500, the communication link between two first/third stage switch modules can be established via the special-purpose link 500. For example, in the example of FIG. 8, a communication link between the first/third stage switch modules 100 and 10n can be established via the lines 421 through 42n (i.e. via the first/third stage switch modules 101 through 10(n-1)). Incidentally, while no two first/third stage switch modules which are not adjacent each other are not directly connected by a line of the special-purpose link 500 in FIG. 8, the connection of the special-purpose link 500 of FIG. 8 is the simplest example, and thus the special-purpose link 500 can also have some lines connecting first/third stage switch modules which are not adjacent each other. Establishment of a communication link between two first/third stage switch modules via the special-purpose link 500 is possible if every two first/third stage switch modules are at least connected by lines of the special-purpose link 500. Therefore, the connection of second example can be expressed as "connection in which communication links between every two first/third stage switch modules can at least be set via one or more lines of the special-purpose link 500".

Therefore, also by the connection of the special-purpose link 500 of the second example, even when the second stage switch module 200 is in an abnormal condition and can not operate normally, the communication link between two first/third stage switch modules can be established via the special-purpose link 500 (not via the second stage switch module 200), by control operations which will be described later.

As explained above, the high-capacity electronic switching system the first embodiment has two ways for setting the communication link between the first/third stage switch modules 100, 101, ..., 10n, that is, sitting the communication link via the second stage switch module 200, and setting the communication link via the special-purpose link interfaces 140, 141, ..., 14n and the special-purpose link 500.

The types of the special-purpose link interfaces 140, 141, ..., 14n, the special-purpose link 500, and signals transmitted by them are not particularly limited, as long as communication between the first/third stage switch modules can be realized. Signals transmitted by the special-purpose link 500 can be analog signals or digital signals, and the signaling method employed by the special-purpose link 500 can be "channel associated signaling" or "common channel signaling". Incidentally, the channel associated signaling means a signaling method in which each line for transmitting signals (speech signals etc.) is provided with a control signal line for transmitting connection control information signals, in a one-to-one correspondence. The channel associated signaling includes a case where each line for transmitting signals also transmits the connection control information signals. The common channel signaling means a signaling method in which a control signal line is provided in order to transmit the connection control information signals for two or more lines (speech circuits etc.).

Figure 9:
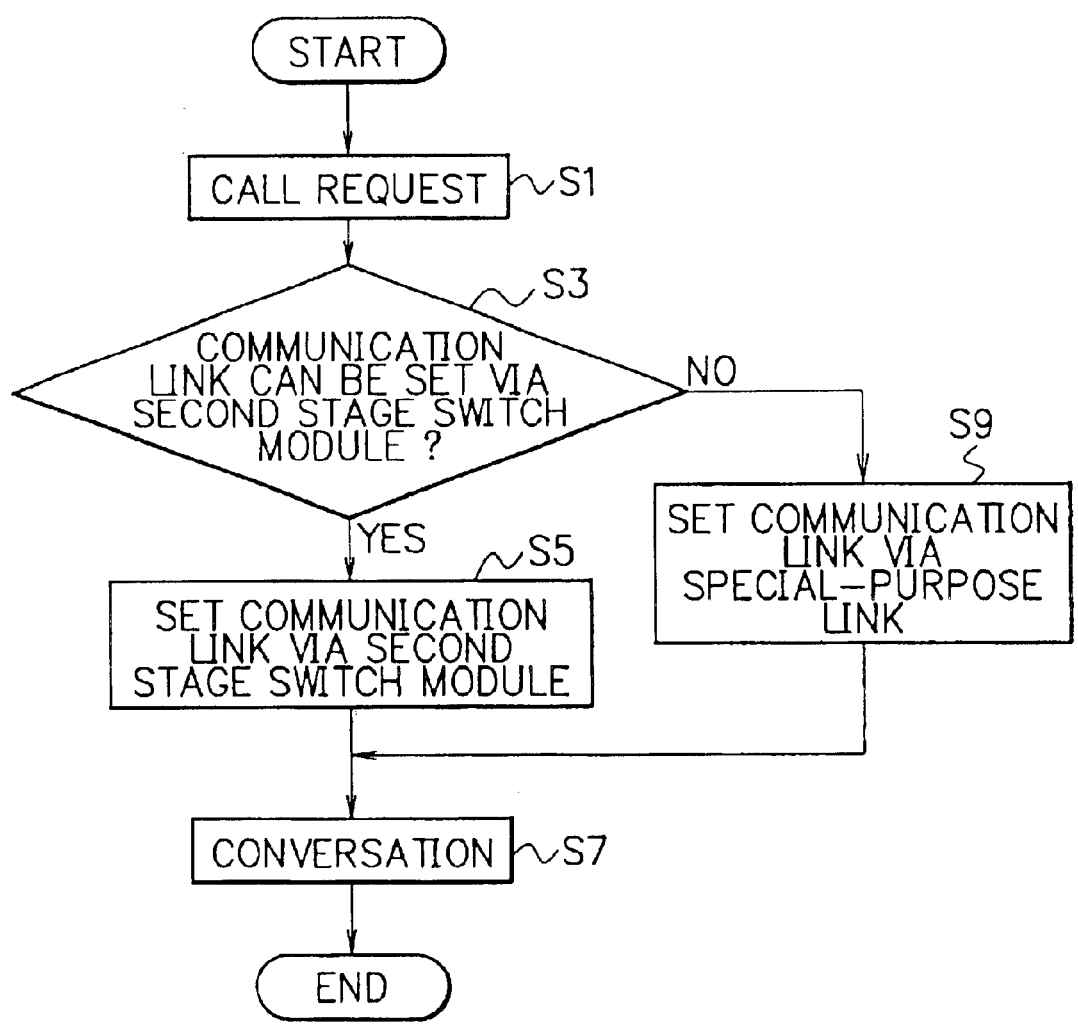
FIG. 9 is a flow chart showing the operation of the high-capacity electronic switching system of FIG. 4.

In the following, the operation of the high-capacity electronic switching system of the first embodiment will be described referring to FIG. 9. FIG. 9 is a flow chart showing the operation of the high-capacity electronic switching system of FIG. 4.

When a subscriber terminal (400, 401, . . . , 40n) requested a call (step S1), a first/third stage switch module (100, 101, . . . , 10n) to which the subscriber terminal is connected receives the request. Subsequently, a central control unit (120, 121, . . . , 12n) of the first/third stage switch module that received the call request judges whether or not a communication link according to the call request can be set via the second stage switch module 200 (step S3).

If the central control unit judged that the setting of the communication link via the second stage switch module 200 is possible ("Yes" in the step S3), setting of the communication link via the second stage switch module 200 is executed (step S5), and thereafter the subscriber terminal goes into conversation status (step S7).

The setting of the communication link via the second stage switch module 200 is realized by the following control operations. As the control operations for setting the communication link (between the subscriber circuit 130 and the subscriber circuit 131, for example) via the second stage switch module 200, the central control unit 220 of the second stage switch module 200 selects idle channels on the inlet TDM lines and the outlet TDM lines of the space division switch 210, the TDM switches 110 and 111 execute time slot exchange (data transfer between time slots) according to the time slots selected by the central control unit 220, and the space division switch 210 executes signal exchange between the same channels (time slots) on the TDM lines 300 and 311 and signal exchange between the same channels (time slots) on the TDM lines 301 and 310.

If the central control unit (120, 121, . . . , 12n) judged that the setting of the communication link via the second stage switch module 200 is impossible due to failure, maintenance, etc. ("No" in the step S3), the process proceeds to step S9. In the step S9, the central control unit that received the call request executes connection of a communication link via the special-purpose link 500, and thereafter, the subscriber terminal goes into the conversation status (step S7). Control operations for setting the communication link via the special-purpose link 500 will be described later.

In the following, the operation of the high-capacity electronic switching system of the first embodiment will be described more in detail referring to FIG. 4.

Figure 3:
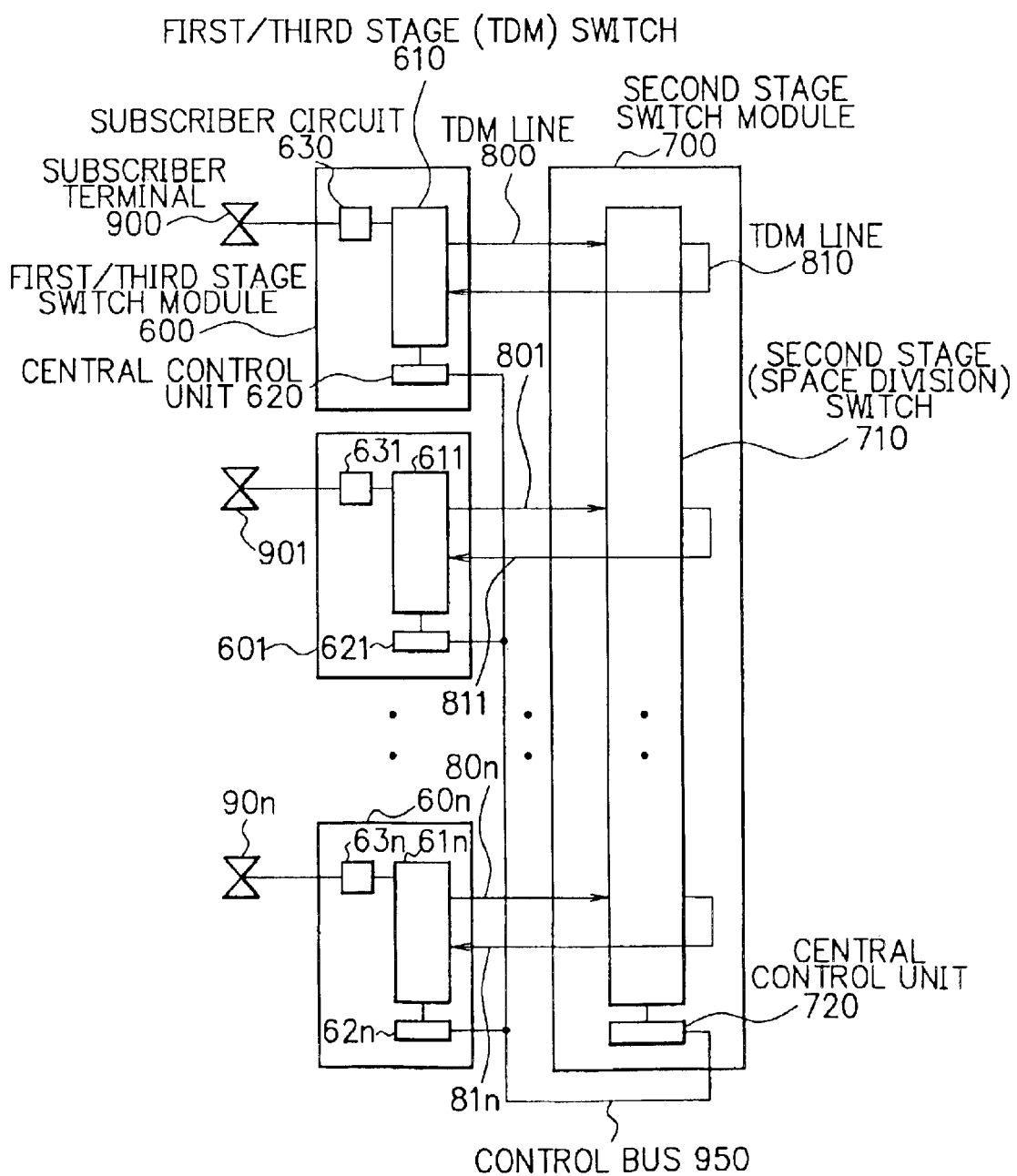
FIG. 3 is a schematic block diagram showing a second example of a conventional high-capacity electronic switching system which is realized by 3 stages of switches.

First, a case where the second stage switch module 200 operates normally will be explained, taking a case where the subscriber terminal 400 connected to the first/third stage switch module 100 operates as the transmitting side and the subscriber terminal 401 connected to the first/third stage switch module 101 operates as the receiving side, as an example. Incidentally, communication link setting in this normal case is executed in the same way as in the conventional high-capacity electronic switching system of FIG. 3.

As mentioned before, the central control units 120, 121 and 220 of the switch modules communicate control information necessary for connecting the communication link between the switch modules, via the control bus 550. By the control information communication, the central control unit 220 of the second stage switch module 200 selects idle channels (idle time slots) on the inlet/outlet TDM lines of the space division switch 210. Based on the selected idle channels, time slot exchange between the subscriber terminal and the TDM line is executed by the TDM switch 110 in the first/third stage switch module (first stage switch module) 100 and by the TDM switch 111 in the first/third stage switch module (third stage switch module) 101. In the second stage switch module 200, signal exchange (time slot exchange) between the same channels (time slots) on the TDM lines 300 and 311 and signal exchange between the same channels on the TDM lines 301 and 310 are executed by the space division switch 210. By the above control operations, the communication link is formed between the subscriber circuit 130 and the subscriber circuit 131.

Next, a case where the second stage switch module 200 can not operate normally and communication link setting via the second stage switch module 200 is impossible will be explained, taking the case where the subscriber terminal 400 is the transmitting side and the subscriber terminal 401 is the receiving side as an example. The operation in this case is characteristic of the high-capacity electronic switching system according to the present invention.

The first/third stage switch modules 100, 101, . . . , 10n detect or are informed by the second stage switch module 200 that communication link setting via the second stage switch module 200 is impossible due to failure of the second stage switch module 200 etc. In such cases, the first/third stage switch modules 100, 101, . . . , 10n can execute signal switching only via communication links not passing the second stage switch module 200.

In order to connect a communication link between the subscriber terminals 400 and 401 in such cases, the first/third stage switch modules 100 and 101 are connected together using the special-purpose link 500, since the second stage switch module 200 can not be used for connection. As explained before referring to FIGS. 7 and 8, the special-purpose link 500 connects every two first/third stage switch modules using one or more of its lines. Wiring of the special-purpose link 500 to be used for connecting two first/third stage switch modules is not necessarily limited to one wiring. For example, with regard to wiring between the first/third stage switch modules 100 and 105, the special-purpose link 500 can be provided with two or more lines which directly connect the first/third stage switch modules 100 and 105 in order to meet large traffic volume. Or, the special-purpose link 500 can have a line connecting the first/third stage switch modules 100 and 101 and a line connecting the first/third stage switch modules 101 and 105 as well as having a line directly connecting the first/third stage switch modules 100 and 105. Wirings of the special-purpose link 500 (i.e. combinations of lines in the special-purpose link 500) to be used for connecting two first/third stage switch modules have previously been determined, and the priority order between the wirings has preliminarily been set. Once a wiring of the special-purpose link 500 is determined to be used for a call, the wiring is not altered during the call.

For setting the communication link between the subscriber terminal 400 which is connected to the first/third stage switch module 100 and the subscriber terminal 401 which is connected to the first/third stage switch module

101, the central control unit 120 of the first/third stage switch module 100 determines to set a communication link using the special-purpose link 500 not using the second stage switch module 200, and checks whether or not an idle circuit exists in the special-purpose link interface 140 which is connected to a line of the special-purpose link 500 that is connected to the destination first/third stage switch module 101.

If there is an idle circuit, the central control unit 120 selects and seizes the idle circuit of the special-purpose link interface 140, and executes calling operation to the destination first/third stage switch module 101 via the special-purpose link interface 140. Concretely, the central control unit 120 of the first/third stage switch module 100 can recognize that the destination first/third stage switch module is the first/third stage switch module 101, since the central control unit 120 has received selection information (a telephone number, an IP address, etc.) of the called subscriber terminal 401 from the subscriber terminal 400.

While only one special-purpose link interface 140 is connected to the TDM switch 110 in FIG. 4, a plurality of special-purpose link interfaces can be connected to the TDM switch 110 via TDM lines. Therefore, the central control unit 120 selects and seizes one idle circuit of one of the special-purpose link interfaces (the special-purpose link interface 141) that is connected to a line of the special-purpose link 500 that is connected to the destination first/third stage switch module 101.

The TDM switch 110 of the first/third stage switch module 100 transfers information in a time slot (corresponding to the subscriber terminal 400) on the inlet TDM line to a time slot (that corresponds to the seized idle circuit of the special-purpose link interface 141) on the outlet TDM line (corresponding to the special-purpose link interface 141).

Incidentally, prior to the connection operation (switching operation) described above, a control operation (communication of an activation signal, a connection confirm signal, etc.) is executed between the first/third stage switch modules 100 and 101, and the selection information (a selection signal) is sent to the first/third stage switch module 101, in order to form a communication link between the special-purpose link interface 141 and the called subscriber terminal 401 in the destination first/third stage switch module 101.

In the first/third stage switch module 101, the central control unit 121 detects by the selection information that the calling received by the special-purpose link interface 141 is a calling to the subscriber terminal 401, and connects the special-purpose link interface 141 and the subscriber circuit 131 if the subscriber terminal 401 is in an idle condition. The connection operation in the first/third stage switch module 101 is executed similarly to the connection operation in the first/third stage switch module 100 which has been described above.

Concretely, the TDM switch 111 of the first/third stage switch module 101 transfers signals in a time slot supplied from the special-purpose link interface 141 (which received the call) into a time slot on its outlet TDM line corresponding to the subscriber terminal 401. Due to the connection operation, when the subscriber terminal 401 responded to the call, the central control unit 120 in the first/third stage switch module 100 executes the aforementioned connection control and thereby establishes the communication link between the subscriber circuit 130 and the special-purpose link interface 140, that is, the time slot exchange by the TDM switch 110 is actually executed.

As mentioned before, the types of the special-purpose link 500, the special-purpose link interfaces 140, 141, . . . , 14n, signals transmitted by them, and the signaling method are not particularly limited, and ordinary ones which are generally employed for connection between switches can be employed. Via the special-purpose link 500 and the special-purpose link interfaces 140, 141, . . . , 14n, communication link setting between the first/third stage switch modules 100, 101, . . . , 10n is executed.

Therefore, even when the communication link setting via the second stage switch module 200 is impossible (for example, when failure (an abnormal condition) occurred in the second stage switch module 200), a communication link between the subscriber terminal 400 which is connected to the first/third stage switch module 100 and the subscriber terminal 401 which is connected to the first/third stage switch module 101 can be set without using the second stage switch module 200.

In the following, some cases in which communication link setting via the second stage switch module 200 is impossible will be shown referring to FIGS. 10A, 10B, 11A and 11B.

Figure 10A:
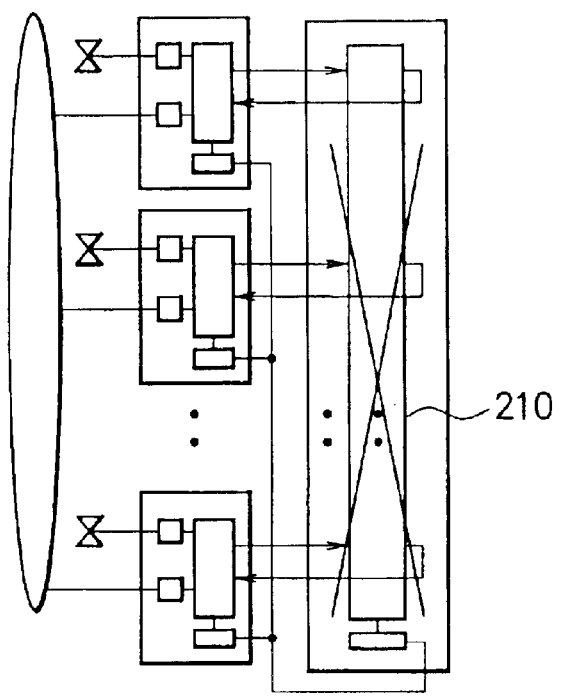
FIG. 10A is a schematic diagram showing a case where a space division switch of a second stage switch module of the high-capacity electronic switching system of FIG. 4 is in an abnormal condition.

The first is the case shown in FIG. 10A in which the space division switch 210 of the second stage switch module 200 is in an abnormal condition. In this case, abnormality of space division switch 210 is detected by the central control unit 220, and the central control unit 220 informs the central control units 120, 121, . . . , 12n of the first/third stage switch modules 100, 101, . . . , 10n about the abnormal condition.

Figure 10B:
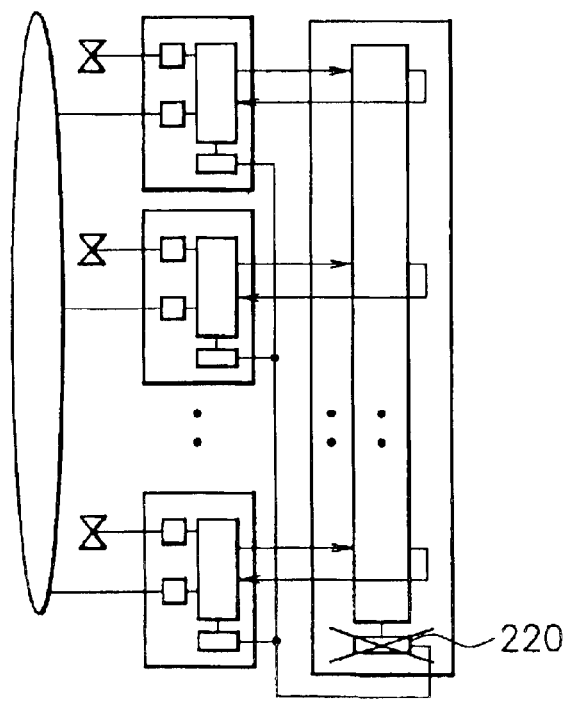
FIG. 10B is a schematic diagram showing a case where a central control unit of the second stage switch module is in an abnormal condition.

The second is the case shown in FIG. 10B in which the central control unit 220 of the second stage switch module 200 is in an abnormal condition. The second case includes failure in the central control unit 220 and power failure to the central control unit 220. In this case, communication between the central control unit 220 and the first/third stage switch modules 100, 101, . . . , 10n via the control bus 550 is impossible.

The third is the case shown in FIG. 1A in which the control bus 550 is in an abnormal condition. In this case, data communication between the second stage switch module 200 and the first/third stage switch modules 100, 101, . . . , 10n via the control bus 550 is impossible due to the abnormality of the control bus 550.

Figure 11A:
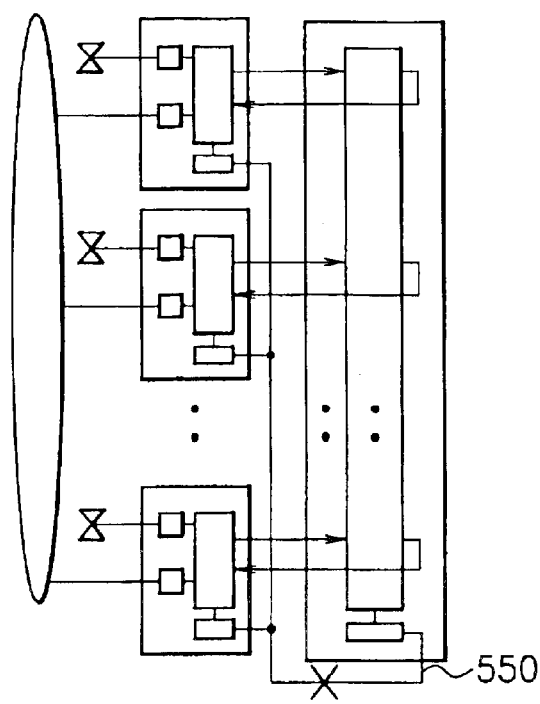
FIG. 11A is a schematic diagram showing a case where a control bus of the high-capacity electronic switching system of FIG. 4 is in an abnormal condition.
Figure 11B:
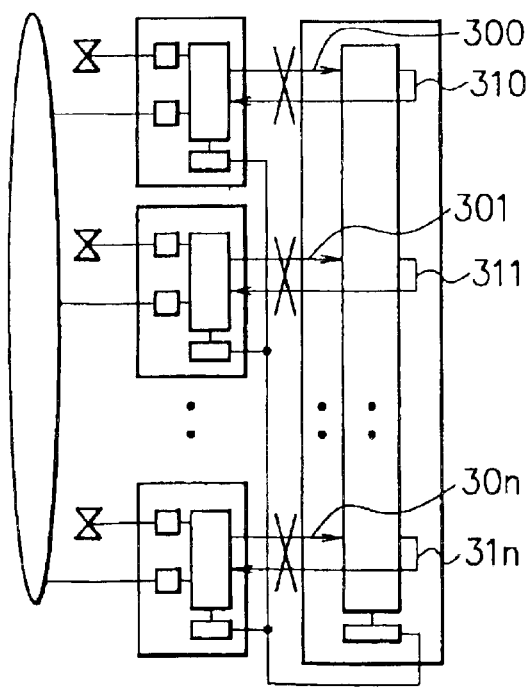
FIG. 11B is a schematic diagram showing a case where TDM lines for connecting the second stage switch module and the first/third stage switch modules are in an abnormal condition.

The fourth is the case shown in FIG. 11B in which the TDM lines 300, 301, . . . , 30n, 310, 311, . . . , 31n which connect the second stage switch module 200 and the first/third stage switch modules 100, 101, . . . , 10n are in abnormal conditions. Incidentally, while FIG. 11B is showing a case where all the TDM lines 300, 301, . . . , 30n, 310, 311, . . . , 31n are in abnormal conditions as an example, the fourth case includes all the cases in which communication link setting via the second stage switch module 200 is impossible due to abnormal conditions of one or more TDM lines. In these cases, a central control unit (120, 121, . . . , 12n) of a first/third stage switch module (100, 101, . . . , 10n) detects that communication link setting between the first/third stage switch module (100, 101, . . . , 10n) and the second stage switch module 200 is impossible due to abnormality of the TDM line and informs the second stage switch module 200 about the status via the control bus 550, or the central control unit 220 of the second stage switch module 200 detects that communication link setting between the second stage switch module 200 and a first/third stage switch module (100, 101, . . . , 10n) is impossible due to abnormality of the TDM line and informs the first/third stage switch module (100, 101, . . . , 10n) about the status via the control bus 550.

While the above four cases have been described, the cases where communication link setting via the second stage switch module 200 is impossible are not limited to the above four cases shown in FIGS. 10A through 11B. For example, combinations of the above cases etc. are also included.

Incidentally, in the high-capacity electronic switching system of this embodiment, the number of channels in each TDM line (300, 301, . . . , 30*n*, 310, 311, . . . , 31*n*) and the capacity of the space division switch 210 are set large enough so that all of the subscriber circuits and the trunk circuits connected to each first/third stage switch module can be connected to all other first/third stage switch modules, since the communication link setting should usually be executed via the second stage switch module 200. Meanwhile, the number of channels in each line of the special-purpose link 500 for being used for the communication link setting without the second stage switch module 200 can be set adequately according to design requirements etc.

Figure 12:
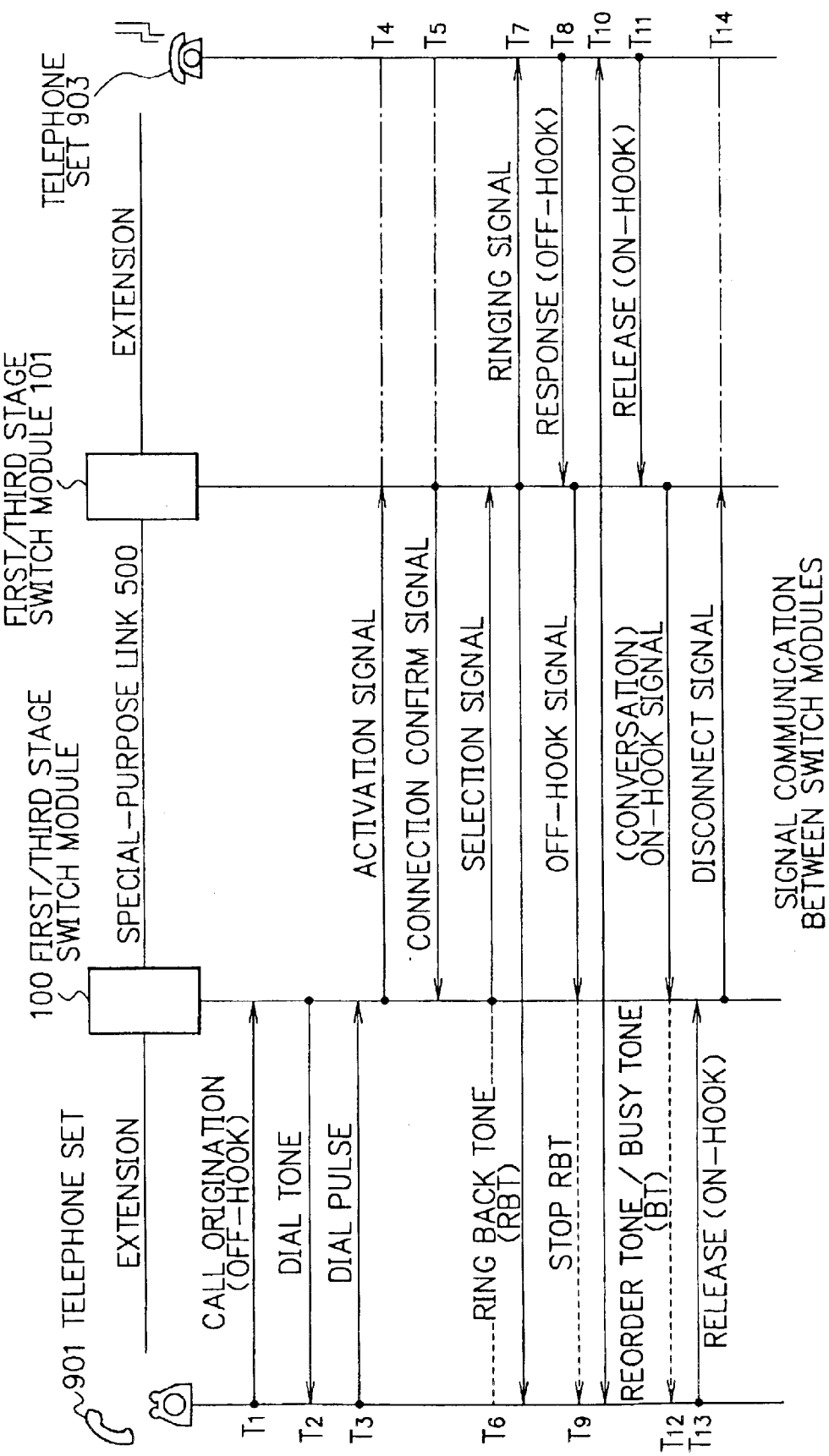
FIG. 12 is a schematic diagram showing an example of the operation of the high-capacity electronic switching system of FIG. 4 for setting a communication link via the special-purpose link.

In the following, the operation of the high-capacity electronic switching system for setting the communication link via the special-purpose link 500 in the case where the communication link setting via the second stage switch module 200 is impossible will be described referring to FIG. 12. FIG. 12 is a schematic diagram showing an example of the operation of the high-capacity electronic switching system for setting the communication link via the special-purpose link 500.

FIG. 12 depicts an example in which the transmitting side subscriber terminal is a telephone set 901 and the receiving side subscriber terminal is a telephone set 903, and the telephone sets 901 and 903 are subscriber terminals connected to the first/third stage switch modules 100 and 101 respectively.

First, the telephone set 901 executes call origination, that is, a calling party lifts the handset (step T1). Subsequently, the first/third stage switch module 100 which detected the call origination sends back the dial tone to the telephone set 901 (step T2). Subsequently, the calling party dials and the telephone set 901 sends the dial pulse to the first/third stage switch module 100 (step T3). Subsequently, the first/third stage switch module 100 which received the dial pulse sends an activation signal to the first/third stage switch module 101 via the special-purpose link 500, since the second stage switch module 200 can not be used (step T4). Subsequently, the first/third stage switch module 101 which received the activation signal sends a connection confirm signal to the first/third stage switch module 100 via the special-purpose link 500 (step T5). Subsequently, the first/third stage switch module 100 which received the connection confirm signal sends a selection signal (address signal) to the first/third stage switch module 101 via the special-purpose link 500 (step T6).

Subsequently, the first/third stage switch module 101 which received the selection signal requests the first/third stage switch module 100 via the special-purpose link 500 to output the ring back tone (RBT) to the telephone set 901, and sends a ringing signal to the telephone set 903 (step T7). Subsequently, the telephone set 903 which received the ringing signal responds to the ringing, that is, a receiving party (called party) lifts the handset of the telephone set 903 (step T8). Subsequently, the first/third stage switch module 101 sends an off-hook signal (answer signal) to the first/third stage switch module 100 via the special-purpose link 500, and the first/third stage switch module 100 which received the off-hook signal stops the ring back tone to, the telephone set 901 (step T9). Subsequently, communication (conversation) between the telephone sets 901 and 903 is done via the special-purpose link 500 (step T10).

Subsequently, the telephone set 903 releases the extension, that is, the called party puts down the handset, and the status is detected by the first/third stage switch module 101 (step T11). Subsequently, the first/third stage switch module 101 sends an on-hook signal (hang-up signal) to the first/third stage switch module 100 via the special-purpose link 500, and the first/third stage switch module 100 which received the on-hook signal sends the reorder tone or the busy tone (BT) to the telephone set 901 (step T12). Subsequently, the telephone set 901 which detected the reorder tone or the busy tone releases the extension, that is, the calling party puts down the handset, and the status is detected by the first/third stage switch module 100 (step T13). Subsequently, the first/third stage switch module 100 sends a disconnect signal to the first/third stage switch module 101 via the special-purpose link 500 (step T14), and thereby the communication between the telephone sets 901 and 903 is finished. Incidentally, the operation which has been shown in FIG. 12 is only an example. and thus some steps in FIG. 12 can be omitted if unnecessary, or some steps can be added if necessary.

As described above, in the high-capacity electronic switching system according to the first embodiment of the present invention, the communication link between subscriber terminals can be established via the special-purpose link 500 even if the communication link setting via the second stage switch module 200 is impossible, and thereby communication between the subscriber terminals can be realized via the special-purpose link 500. Therefore, according to the first embodiment, a high-capacity electronic switching system which is resistant to failure (abnormal conditions) can be provided.

Figure 13A:
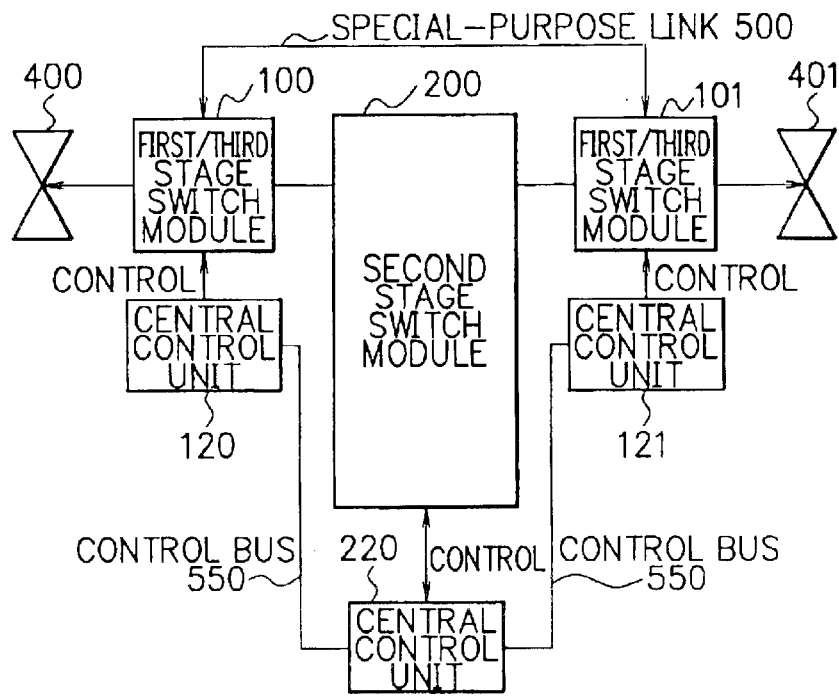
FIG. 13A is a schematic block diagram showing central control units of the high-capacity electronic switching system of FIG. 4 which are provided to each switch module in a decentralized manner.
Figure 13B:
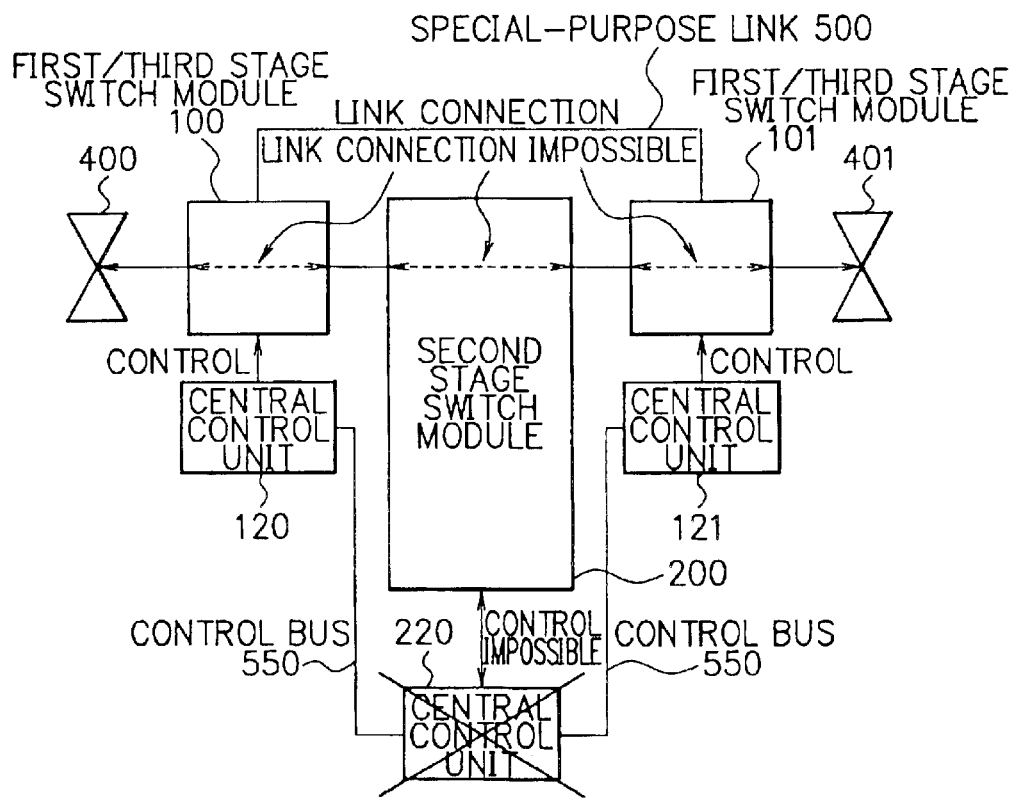
FIG. 13B is a schematic block diagram showing a case where failure occurred to the central control unit of the second stage switch module.

In addition, in the high-capacity electronic switching system of the first embodiment, central control units of the first/third stage switch modules and the second stage switch module are provided dispersively or in a decentralized manner as shown in FIG. 13A, therefore, the risk of failure is partitioned among many switch modules. For example, when failure occurred to the central control unit 220 of the second stage switch module 200 as shown in FIG. 13B, the second stage switch module 200 can not operate normally and the normal communication link setting via the second stage switch module 200 becomes impossible since the second stage switch module 200 is controlled by the central control unit 220. However, the central control units 120 and 121 can normally control the first/third stage switch modules 100 and 101, and thus a communication link can be set between the first/third stage switch modules 100 and 101 via the special-purpose link 500.

Incidentally, while description has been given above on the assumption that control information necessary for the communication link setting via the special-purpose link 500 is communicated between the central control units of the first/third stage switch modules via the special-purpose link 500, the control information for the communication link setting via the special-purpose link 500 can also be communicated via the control bus 550 if the control bus 550 is usable.

FIG. 14 is a schematic block diagram showing a high-capacity electronic switching system according to a second embodiment of the present invention. The high-capacity electronic switching system of FIG. 14 is not a switching system of the 3-stage connection. The number of stages (switch modules) to be used for usual communication link setting between two subscriber terminals can be an arbitrary number in the high-capacity electronic switching system of FIG. 14, differently from the 3-stage switching system of the first embodiment.

Referring to FIG. 14, the high-capacity electronic switching system of the second embodiment includes n (n: integer larger than 1) second stage switch modules 8401, 8402, . . . , 840n and first/m-th stage switch modules 8101, 8102, . . . , 8n0c. One or more first/m-th stage switch modules 8101, 8102, . . . , 810a are connected to the second stage switch module 8401, one or more first/m-th stage switch modules 8201, 8202, . . . , 820b are connected to the second stage switch module 8402, . . . , and one or more first/m-th stage switch modules 8n01, 8n02, . . . , 8n0c are connected to the second stage switch module 840n. Incidentally, the number "m" in the above expressions "first/m-th stage switch modules" is not a fixed number, but varies depending on each call.

In FIG. 14, the first/m-th stage switch modules to which subscriber terminals are connected are not connected together by one special-purpose link as in the first embodiment, but are connected by a special-purpose link 8001 (which connects the first/m-th stage switch modules 8101, 8102, . . . , 810a), a special-purpose link 8002 (which connects the first/m-th stage switch modules 8201, 8202, . . . , 820b), . . . , and a special-purpose link 800n (which connects the first/m-th stage switch modules 8n01, 8n02, . . . , 8n0c), respectively and dispersively (in a decentralized manner). Such connection of the special-purpose links is advantageous for reducing cost and simplifying the structure of the high-capacity electronic switching system.

Although not shown in FIG. 14, the second stage switch modules 8401, 8402, . . . , 840n are connected to one or more third stage switch modules via TDM lines 8601, 8602, . . . , 860n. In the same way, the one or more third stage switch modules can be connected to one or more fourth stage switch modules, and such connection can be continued to a predetermined stage number.

In addition, while the special-purpose link 500 in the first embodiment connected the first/third stage switch modules only, the high-capacity electronic switching system of the second embodiment is provided with a special-purpose link 8100 for connecting the second stage switch modules 8401, 8402, . . . , 840n together, as well as the special-purpose links 8001, 8002, . . . , 800n connecting the first/m-th stage switch modules 8101, 8102, . . . , 8n0c dispersively.

Incidentally, while all the second stage switch modules 8401, 8402, . . . , 840n are connected together by one special-purpose link 8100 in the example of FIG. 14, the second embodiment is not limited to such an example. For example, the second stage switch modules 8401, 8402, . . . , 840n can be divided into two or more groups, and two or more special-purpose links can be provided in order to connect the second stage switch modules of each of the groups dispersively in the same way as the special-purpose links 8001, 8002, . . . , 800n connecting the first/m-th stage switch modules 8101, 8102, . . . , 8n0c dispersively. Such connection is advantageous for reducing cost and simplicity of structure.

In the same way, the one or more third stage switch modules can also be connected together by one or more special-purpose links, and ditto for the upper stage switch modules.

By such connection of the special-purpose links, even when failure (abnormal conditions) occurred in an unshown switch module which is placed on the right-hand side of the second stage switch module 8401, the second stage switch module 8401 can be connected to another second stage switch module (8402, 840n, etc.) via the special-purpose link 8100.

The abnormal conditions of the unshown switch module include the cases which have been explained in the first embodiment referring to FIGS. 10A through and 11B.

The types of the special-purpose links connecting the second stage switch modules and the special-purpose links connecting upper stage switch modules are not particularly limited in the same way as in the first embodiment. They can employ analog signals, digital signals, channel associated signaling, common channel signaling, etc.

As described above, in the high-capacity electronic switching system according to the second embodiment of the present invention, as well as connecting the first/m-th stage switch modules 8101, 8102, . . . , 8n0c by the special-purpose links similarly to the first embodiment, upper stage (second stage, third stage, etc.) switch modules are also connected by the special-purpose links, thereby a high-capacity electronic switching system capable of being applied to larger networks realizing resistant to failure (abnormal conditions) can be provided. For example, in the high-capacity electronic switching system of the second embodiment, alternative communication links between two first/m-th stage switch modules can be set in various ways, and thus alternative communication link setting can be executed flexibly depending on failure and traffic.

As set forth hereinabove, according to the present invention, in a high-capacity electronic switching system employing many-stage switch connection (such as the 3-stage connection), alternative communication links can be set between the first stage switch modules (i.e. the first/third stage switch modules, the first/m-th stage switch modules, etc.) without using the upper stage switch module in abnormal conditions (i.e. the second stage switch module 200 etc.), by connecting the first stage switch modules by the special-purpose link.

Therefore, even when failure occurred to an upper stage switch module and normal communication link setting between two first stage switch modules is impossible, an alternative communication link between the two first stage switch modules can be set via the special-purpose link, and thereby communication between subscriber terminals connected to different first stage switch modules is ensured, differently from the conventional high-capacity electronic switching systems.

Further, while conventional high-capacity electronic switching systems had to go out of service when maintenance has to be performed to an upper stage switch module, in the high-capacity electronic switching systems according to the present invention, service can be continued during the maintenance of the upper stage switch module by use of the special-purpose link, therefore, the convenience of the user of a network employing the high-capacity electronic switching system can be improved.

Moreover, in the high-capacity electronic switching systems of more than 3-stage connection according to the present invention, the special-purpose links are also provided to the second stage switch modules, the third stage switch modules, etc. Therefore, communication link setting between two switch modules is ensured via the special-purpose links even when failure occurred to an upper stage switch module and normal communication link setting is impossible, and thus large communication networks having resistance to failure can be constructed by employing the high-capacity electronic switching system according to the present invention.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

For example, while T-S-T three-stage construction was employed in the first embodiment, that is, while a TDM switch was employed for the first/third stage switch module and a space division switch was employed for the second stage switch module in the first embodiment, the types of the switch modules are not limited to the example. Each switch module can be a combination of a TDM switch and a space division switch, or other type of a switch such as an ATM switch etc. In addition, while each central control unit controlled one corresponding switch module (first/third stage switch module 100, second stage switch module 200, etc.) in the first embodiment, it is also possible to let a central control unit control two or more switch modules. Therefore, the relationship between the number of the switch modules and the number of central control units can be varied adequately. Moreover, while every one of the first stage switch modules was provided with the special-purpose link for connecting the first stage switch module to another first stage switch module in the above embodiments, of course it is also possible to leave some of the first stage switch modules unconnected to the special-purpose link if unnecessary. In the same way, while every one of the second stage switch modules was provided with the special-purpose link in the second embodiment, it is also possible to leave some of the second stage switch modules unconnected to the special-purpose link if unnecessary.

What is claimed is:

1. A high-capacity electronic switching system comprising:
    two or more first stage switch modules to each of which one or more subscriber terminals are connected and each of which executes signal switching for signals from/to the subscriber terminals; and
    a second stage switch module providing a communication path by receiving a signal outputted by one of the first stage switch modules via a first line, switching the signal, and outputting the signal to another one of the first stage switch modules via a second line, wherein:
    each of the first stage switch modules is connected to another one of the first stage switch modules via a special-purpose link for setting a communication link between the first stage switch modules, said special-purpose link separate and distinct from said communication path; and
    said switch system further comprising one or more central control units for controlling the first stage switch modules and the second stage switch module;
    wherein the central control units include one or more first central control units for controlling the first stage switch modules and a second central control unit for controlling the second stage switch module, and control information is communicated between the central control units via a control bus; and
    wherein the setting of the communication link via the special-purpose link is executed when an abnormal condition of the control bus has occurred and the control information communication between the central control units via the control bus is abnormal or impossible.

2. A high-capacity electronic switching system as claimed in claim 1, wherein every two of the first stage switch modules are connected together by a line of the special-purpose link directly.

3. A high-capacity electronic switching system as claimed in claim 1, wherein the special-purpose link connects the first stage switch modules so that communication links between every two first stage switch modules can at least be set via one or more lines of the special-purpose link.

4. A high-capacity electronic switching system as claimed in claim 1, wherein the setting of the communication link via the special-purpose link is executed when an abnormal condition of the second stage switch module has occurred and a normal communication between two first stage switch modules via the second stage switch module is impossible.

5. A high-capacity electronic switching system as claimed in claim 1, wherein the setting of the communication link via the special-purpose link is executed when an abnormal condition of at least one of the first and second lines has occurred and normal communication link setting between the two first stage switch modules via the first and second lines is impossible.

6. A high-capacity electronic switching system as claimed in claim 1, wherein the special-purpose link communicates analog signals.

7. A high-capacity electronic switching system as claimed in claim 1, wherein the special-purpose link communicates digital signals.

8. A high-capacity electronic switching system as claimed in claim 1, wherein the special-purpose link employs channel associated signaling.

9. A high-capacity electronic switching system as claimed in claim 1, wherein the special-purpose link employs common channel signaling.

10. A high-capacity electronic switching system comprising:
    two or more first stage switch modules to each of which one or more subscriber terminals are connected and each of which executes signal switching for signals from/to the subscriber terminals; and
    two or more second stage switch modules each of which provides communication paths by executing switching between the first stage switch modules and signal switching between the first stage switch module and a third stage switch module, wherein:
    each of the first stage switch modules is connected to another one of the first stage switch modules via a special-purpose link for setting a communication link between the first stage switch modules, said communication link separate and distinct from said communication path, and
    each of the second stage switch modules is connected to another one of the second stage switch modules via a special-purpose link for setting a communication link between the second stage switch modules,
    said switching system including one or more central control units for controlling the switch modules, and control information is communicated between the central control units via a control bus, and
    wherein the setting of the communication link via the special-purpose link is executed when an abnormal condition of the control bus has occurred and communication of the control information between the central control units via the control bus is impossible.

11. A high-capacity electronic switching system as claimed in claim 10, wherein every two of the second stage switch modules are connected together by a line of the special-purpose link directly.

12. A high-capacity electronic switching system as claimed in claim 10, wherein the special-purpose link connects the second stage switch modules so that communication links between every two second stage switch modules can at least be set via one or more lines of the special-purpose link.

13. A high-capacity electronic switching system as claimed in claim 10, wherein the setting of the communication link via the special-purpose link is executed when an abnormal condition of an upper stage switch module occurred and normal communication link setting between two switch modules via the upper stage switch module is impossible.

14. A high-capacity electronic switching system as claimed in claim 10, wherein the setting of the communication link via the special-purpose link is executed when an abnormal condition of a line between switch modules has occurred and normal communication link setting between two switch modules via the line is impossible.

15. A high-capacity electronic switching system as claimed in claim 10, wherein the special-purpose link communicates analog signals.

16. A high-capacity electronic switching system as claimed in claim 10, wherein the special-purpose link communicates digital signals.

17. A high-capacity electronic switching system as claimed in claim 10, wherein the special-purpose link employs channel associated signaling.

18. A high-capacity electronic switching system as claimed in claim 10, wherein the special-purpose link employs common channel signaling.

19. A high-capacity electronic switching method for a high-capacity electronic switching system including two or more first stage switch modules to each of which one or more subscriber terminals are connected and each of which executes signal switching for signals from/to the subscriber terminals, and a second stage switch module providing a communication path by receiving a signal outputted by one of the first stage switch modules via a first line, switching the signal, and thereby outputting the signal to another one of the first stage switch modules via a second line, wherein:
    each of the first stage switch modules is connected to another one of the first stage switch modules via a special-purpose link, and a communication link is set between the first stage switch modules via the special-purpose link, said communication link separate and distinct from said communication path,
    wherein the setting of the communication link via the special-purpose link is executed when an abnormal condition of a control bus for communicating necessary control information between central control units of the switch modules has occurred and the control information communication between the central control twits via the control bus is impossible.

20. A high-capacity electronic switching method as claimed in claim 19, wherein every two of the first stage switch modules are connected together by a line of the special-purpose link directly.

21. A high-capacity electronic switching method as claimed in claim 19, wherein the special-purpose link is connected so that communication links between every two first stage switch modules can at least be set via one or more lines of the special-purpose link.

22. A high-capacity electronic switching method as claimed in claim 19, wherein the setting of the communication link via the special-purpose link is executed when an abnormal condition of the second stage switch module has occurred and normal communication link setting between two first stage switch modules via the second stage switch module is impossible.

23. A high-capacity electronic switching method as claimed in claim 19, wherein the setting of the communication link via the special-purpose link is executed when an abnormal condition of the first line between the first stage switch module and the second stage switch module has occurred and a normal communication link setting between two first stage switch modules via the line is impossible.

24. A high-capacity electronic switching method for a high-capacity electronic switching system including two or more first stage switch modules to each of which one or more subscriber terminals are connected and each of which provides a communication path by executing signal switching for signals from/to the subscriber terminals, and two or more second stage switch modules each of which executes signal switching between the first stage switch modules and signal switching between the first stage switch module and a third stage switch module, wherein:
    each of the first stage switch modules is connected to another one of the first stage switch modules via a special-purpose link, and a communication link is set between the first stage switch modules via the special-purpose link, said communication link being separate and distinct from said communication path, and
    each of the second stage switch modules is connected to another one of the second stage switch modules via a special-purpose link, and a communication link is set between the second stage switch modules via the special-purpose link,
    wherein the setting of the communication link via the special-purpose link is executed when an abnormal condition of a control bus for communicating control information between central control units of the switch modules has occurred and communication of the control information between the central control units via the control bus is impossible.

25. A high-capacity electronic switching method as claimed in claim 24, wherein every two of the second stage switch modules are connected together by a line of the special-purpose link directly.

26. A high-capacity electronic switching method as claimed in claim 24, wherein the special-purpose link is connected so that communication links between every two second stage switch modules can at least be set via one or more lines of the special-purpose link.

27. A high-capacity electronic switching method as claimed in claim 24, wherein the setting of the communication link via the special-purpose link is executed when an abnormal condition of an upper stage switch module occurred and a normal communication link setting between two switch modules via the upper stage switch module is impossible.

28. A high-capacity electronic switching method as claimed in claim 24, wherein the setting of the communication link via the special-purpose link is executed when an abnormal condition of a line between switch modules has occurred and a normal communication link setting between two switch modules via the line is impossible.

* * * * *